United States Patent
Jeong

(10) Patent No.: US 9,137,487 B2
(45) Date of Patent: Sep. 15, 2015

(54) APPARATUS AND METHOD FOR PROVIDING VIDEO CALL IN PORTABLE TERMINAL

(71) Applicant: Samsung Electronics Co., Ltd., Gyeonggi-do (KR)

(72) Inventor: Jin-Hong Jeong, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/107,234

(22) Filed: Dec. 16, 2013

(65) Prior Publication Data

US 2014/0168346 A1    Jun. 19, 2014

(30) Foreign Application Priority Data

Dec. 17, 2012 (KR) .................. 10-2012-0147441

(51) Int. Cl.
    *H04N 7/14*    (2006.01)
(52) U.S. Cl.
    CPC ........... *H04N 7/141* (2013.01); *H04M 2201/50* (2013.01)
(58) Field of Classification Search
    CPC ................................... H04N 7/141
    USPC ........... 348/14.01, 14.02, 143, 239, 564, 565;
        455/412.1, 550.1, 418; 715/765, 752;
        725/62, 75; 345/419; 707/737;
        379/93.21
    See application file for complete search history.

(56) References Cited

U.S. PATENT DOCUMENTS

| | | | |
|---|---|---|---|
| 6,833,874 B2 * | 12/2004 | Ozaki et al. | 348/565 |
| 7,274,948 B2 * | 9/2007 | Kim et al. | 455/550.1 |
| 8,169,462 B2 * | 5/2012 | Ryu | 348/14.02 |
| 8,244,229 B2 * | 8/2012 | Lindfors et al. | 455/418 |
| 8,248,449 B2 * | 8/2012 | Han | 348/14.02 |
| 8,301,187 B2 * | 10/2012 | Jeong et al. | 455/550.1 |
| 8,330,866 B2 * | 12/2012 | Walker et al. | 348/565 |
| 8,396,197 B2 * | 3/2013 | Jiang | 379/93.21 |
| 8,432,430 B2 * | 4/2013 | Jun et al. | 348/14.01 |
| 8,463,317 B2 * | 6/2013 | Lee et al. | 455/550.1 |
| 8,713,613 B2 * | 4/2014 | Tranchina | 725/75 |
| 8,780,160 B2 * | 7/2014 | Choi et al. | 348/14.01 |
| 8,872,975 B2 * | 10/2014 | Aoyama | 348/564 |
| 2002/0109770 A1 | 8/2002 | Terada | |
| 2004/0145654 A1 | 7/2004 | Motohashi | |
| 2005/0264647 A1 | 12/2005 | Rzeszewski et al. | |
| 2008/0072263 A1 * | 3/2008 | Kim | 725/62 |
| 2008/0291261 A1 * | 11/2008 | Park et al. | 348/14.02 |
| 2009/0163178 A1 * | 6/2009 | Kim | 455/412.1 |
| 2009/0309970 A1 * | 12/2009 | Ishii et al. | 348/143 |
| 2011/0115874 A1 * | 5/2011 | Chang et al. | 348/14.02 |

(Continued)

FOREIGN PATENT DOCUMENTS

EP    1 981 254 A2    10/2008
JP    2004-228805 A    8/2004

(Continued)

*Primary Examiner* — Gerald Gauthier
(74) *Attorney, Agent, or Firm* — Cha-Reiter, LLC.

(57) ABSTRACT

Various embodiments of the invention provide an apparatus and method for providing a video call in a portable terminal. The method includes displaying a plurality of first image data in a predetermined first area; transmitting the a plurality of the first image data; receiving a plurality of second image data from another portable terminal; and displaying the plurality of the second image data in a predetermined second area.

30 Claims, 29 Drawing Sheets

(56) References Cited

U.S. PATENT DOCUMENTS

| | | | |
|---|---|---|---|
| 2011/0242103 A1* | 10/2011 | Han et al. | 345/419 |
| 2011/0242267 A1 | 10/2011 | Woo | |
| 2012/0191709 A1* | 7/2012 | Morrison et al. | 707/737 |
| 2012/0216127 A1* | 8/2012 | Meyr | 715/752 |
| 2013/0050394 A1* | 2/2013 | Zhou | 348/14.02 |
| 2013/0159903 A1* | 6/2013 | Yu et al. | 715/765 |
| 2014/0146204 A1* | 5/2014 | Boss et al. | 348/239 |
| 2014/0168346 A1* | 6/2014 | Jeong | 348/14.02 |

FOREIGN PATENT DOCUMENTS

| | | |
|---|---|---|
| KR | 10-2009-0090753 A | 8/2009 |
| KR | 10-2010-0007447 A | 1/2010 |
| KR | 10-2011-0090001 A | 8/2011 |
| KR | 10-2011-0109359 A | 10/2011 |

* cited by examiner

APPARATUS AND METHOD FOR PROVIDING VIDEO CALL IN PORTABLE TERMINAL

CROSS RELATED APPLICATION

This application claims the benefit of priority under 35 U.S.C. §119(a) of a Korean Patent Application filed in the Korean Intellectual Property Office on Dec. 17, 2012, and assigned Serial No. 10-2012-0147441, the entire disclosure of which is incorporated herein by reference, in its entirety.

BACKGROUND

1. Technical Field

The various embodiments of the disclosure generally relate to portable terminals, and more particularly, to an apparatus and method for providing a video call in a portable terminal.

2. Description of the Related Art

Due to the rapid development of technologies related to portable terminals, a type of portable terminal, "smart phones" came into being. The smart phone provides advanced functions in addition to personal computer (PC)-like functions. For example, the smart phone may run various applications, including e-mail, Internet, e-book functions, etc. In particular, the portable terminal may provide a video call function which transmits or receives and transmits not only the voice, but also the image of the other party. In general, the portable terminal is typically equipped with one or more cameras and may use them to generate a plurality of respective image data. The above information is presented as background information only to assist with an understanding of the present disclosure. No determination has been made, and no assertion is made, as to whether any of the above might be applicable as prior art with regard to the present invention.

SUMMARY

Various embodiments of the invention provide an apparatus and method for providing a video call with a user terminal, which provides a plurality of image data to the other party's user terminal by transmitting or receiving a plurality of image data.

Various embodiments of the invention also provide an apparatus and method for providing a video call in a portable terminal, which provides a plurality of image data to the other party's portable terminal by transmitting or receiving a combined a plurality of image data.

In accordance with an aspect of the embodiments, provided is an apparatus for providing a video call in a portable terminal, the apparatus preferably including: a wireless transceiver; a display unit; and a—controller configured to connect a video call the user terminal between other user terminal and send a plurality of image data related to the video call to the other user terminal through the wireless transceiver, wherein the plurality of image data is configured such that a part of each of the plurality of image data is displayed on one screen.

In accordance with another aspect of the embodiments, a method for providing a video call in a portable terminal, the method preferably including: connecting a video call the user terminal between other user terminal; and sending a plurality of image data related to the video call to the other user terminal, wherein the plurality of image data is configured such that a part of each of the plurality of image data is displayed on one screen.

Other aspects, advantages, and salient features of the invention will become apparent to those skilled in the art from the following detailed description, which, taken in conjunction with the annexed drawings, discloses embodiments of the invention.

BRIEF DESCRIPTION OF THE DRAWINGS

The above and other features and advantages will become more apparent by describing in detail embodiments thereof with reference to the attached drawings in which.

DETAILED DESCRIPTION

The following description with reference to the accompanying drawings is provided to assist in a comprehensive understanding of various embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. For the purposes of clarity and simplicity, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the present disclosure, a user terminal may send image data to the other party's terminal from a plurality of source images, rather than image data comprised of a single source image. For example, image data containing a plurality of images captured by a plurality of cameras is sent. In order for the other party to visibly distinguish each of the plurality of images, at least a part of each image may be displayed on a screen.

A user terminal to which embodiments of the present disclosure are applied is an electronic device that provides a video call function, such as a portable terminal, personal desktop computer, digital wired/wireless phone, digital television, or the like.

The portable terminal according to an embodiment of the present invention is a mobile electronic device that is easily carried by humans (or mounted in or on a vehicle, such as an automobile or motorcycle), and may include video phones, cellular phones, smart phones, International Mobile Telecommunication-2000 (IM-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Books, portable computers (e.g., laptops, tablet PCs, etc.), or digital cameras.

In the following embodiments of the present disclosure as shown in FIGS. 1 to 20, for purposes of clarity, a portable terminal will be used as an example of the user terminal.

Figure 1:
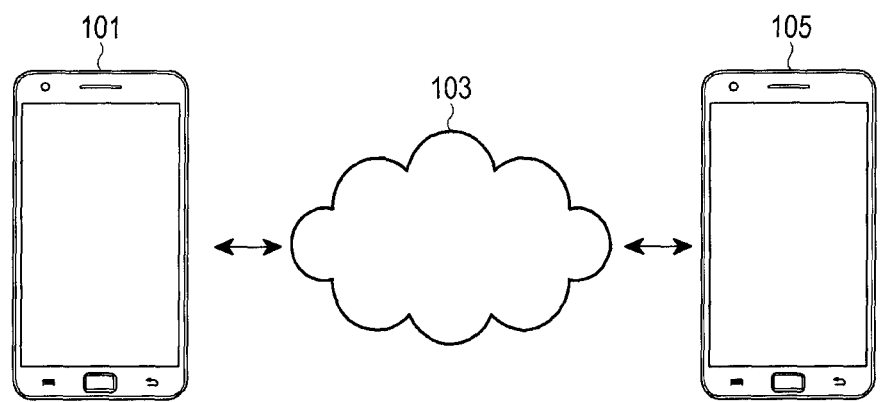
FIG. 1 is a schematic diagram of a communication system, according to an embodiment of the invention.

FIG. 1 is a schematic diagram of a communication system, according to an embodiment of the invention.

Referring to FIG. 1, the communication system typically includes a first portable terminal 101, a wireless communication network 103, and a second portable terminal 105. Although the second portable terminal 105 is shown as being substantially similar in appearance to the first portable terminal, this is for convenience only, as there need not be any similarity between the first portable terminal 101 and the second portable terminal 105.

The first portable terminal 101 performs a video call function with the second portable terminal 105. Specifically, the first portable terminal 101 generates first combined data by combining a plurality of image data based on predetermined first combination setting information when requested to perform the video call function, and displays the first combined data to a user. The first combination setting information refers to information for generating the first combined data, including size information of the first combined data, and position and size information of a plurality of image data included in the first combined data.

The first portable terminal 101 generates second combined data by combining a plurality of image data based on predetermined second combination setting information, and transmits the second combined data to the second portable terminal 105 through the wireless communication network 103. The second combination setting information refers to information for generating the second combined data. Additionally, the second combination setting information may be setting information of a plurality of image data for at least a part of each of a plurality of image data to be displayed on a single screen. The second combination setting information includes size information of the second combined data and position, arrangement, and size information of a plurality of image data included in the second combined data.

The first portable terminal 101 receives fourth combined data from the second portable terminal 105 through the wireless communication network 103, and displays the fourth combined data. As such, the first portable terminal 101 may provide the video call function for the user by displaying the fourth combined data. The first portable terminal 101 may display the fourth combined data together with the first combined data.

The first portable terminal 101 transmits a message to give image control authority to the second portable terminal 105 through the wireless communication network 103 when requested by the user of the first portable terminal 101 for the image control authority while being on the video call with the second portable terminal 105. The image control authority refers to authority for the second portable terminal 105 to change the second combined data displayed in the second portable terminal 105, and the message to give the image control authority is a message to indicate that the second portable terminal 105 is given the image control authority. The first portable terminal 101 transmits a message to withdraw the image control authority to the second portable terminal 105 through the wireless communication network 103 when requested by the user of the first portable terminal 101 for withdrawal of the image control authority. The message to withdraw the image control authority is a message to indicate that the image control authority given to the second portable terminal 105 is to be withdrawn from the second portable terminal 105.

Upon reception of a change request message from the second portable terminal 105 through the wireless communication network 103 while being on the video call with the second portable terminal 105, the first portable terminal 101 updates the second combination setting information according to the change request message. The change request message is a message to request for a change of the second combined data (e.g., reduction or expansion of any of a plurality of image data included in the second combined data, and change in positions among a plurality of image data) displayed in the second portable terminal 105. The first portable terminal 101 generates second combined data by combining a plurality of image data based on the updated second combination setting information, and transmits the second combined data to the second portable terminal 105 through the wireless communication network 103. In another embodiment of the present disclosure, the second combination setting information may be sent to the second portable terminal 105 with the second combined data.

When requested by the user for a change of the first combined data while being on the video call with the second portable terminal 105, the first portable terminal 101 updates the first combination setting information. The change of the first combined data includes reduction or expansion of any part of a plurality of image data included in the second combined data, and position changes among the plurality of image data. Also, the first portable terminal 101 generates first combined data by combining a plurality of image data based on the updated first combination setting information, and displays the first combined data.

The wireless communication network 103 forwards a plurality of data to provide the video call between the first and second portable terminals 101 and 105. Specifically, the wireless communication network 103 receives the second combined data from the first portable terminal 101, forwards the second combined data to the second portable terminal 105, receives the fourth combined data from the second portable terminal 105, and forwards the fourth combined data to the first portable terminal 101. The wireless communication network 103 also receives the message to give the image control authority or the message to withdraw the image control authority from the first portable terminal 101, and forwards the message to give the image control authority or the message to withdraw the image control authority to the second portable terminal 105. The wireless communication network 130 also receives the change request message from the second portable terminal 105, and forwards the change request message to the first portable terminal 101.

The second portable terminal 105 performs the video call function with the first portable terminal 101. Specifically, the second portable terminal 105 generates third combined data by combining a plurality of image data based on predetermined third combination setting information when requested to perform the video call function, and displays the third combined data. The third combination setting information refers to information for generating the third combined data, including size information of the third combined data and position and size information of a plurality of image data included in the third combined data.

The second portable terminal 105 generates fourth combined data by combining a plurality of image data based on predetermined fourth combination setting information, and transmits the fourth combined data to the first portable terminal 101 through the wireless communication network 103. The fourth combination setting information refers to information for generating the fourth combined data. Additionally, the second combination setting information may be setting information of a plurality of image data for at least a part of each of the plurality of image data to be displayed on a single screen. The fourth combination setting information includes size information of the fourth combined data and position, arrangement, and size information of a plurality of image data included in the fourth combined data. In another embodiment of the present disclosure, the fourth combination setting information may be sent to the first portable terminal 105 with the fourth combined data.

The second portable terminal 105 receives the second combined data from the first portable terminal 101 through the wireless communication network 103, and displays the second combined data. As such, the second portable terminal 105 provides the video call function for the user by displaying the third combined data. The second portable terminal 105 may display the third combined data together with the second combined data.

Upon reception of the message to give the image control authority from the first portable terminal 101 through the wireless communication network 103 while being on the video call with the first portable terminal 101, the second portable terminal 105 determines that the second portable terminal 105 obtains the image control authority for the second combined data. Upon reception of the message to withdraw the image control authority from the first portable terminal 101 through the wireless communication network 103, the second portable terminal 105 determines that the second portable terminal 105 loses the image control authority for the second combined data.

Furthermore, when requested by the user for a change of the second combined data while being on the video call with the first portable terminal 101, the second portable terminal 105 generates the change request message, and transmits the change request message to the first portable terminal 101 through the wireless communication network 103. The second portable terminal 105 receives the second combined data generated based on the change request of the user of the second portable terminal 105 from the first portable terminal 101 through the wireless communication network 103, and displays the received second combined data.

When requested by the user for a change of the third combined data while being on the video call with the first portable terminal 101, the second portable terminal 105 updates the third combination setting information. The change of the third combined data includes reduction or expansion of any of a plurality of image data included in the third combined data, and position changes among the plurality of image data. Also, the second portable terminal 105 generates third combined data by combining a plurality of image data based on the updated third combination setting information, and displays the third combined data.

Figure 2:
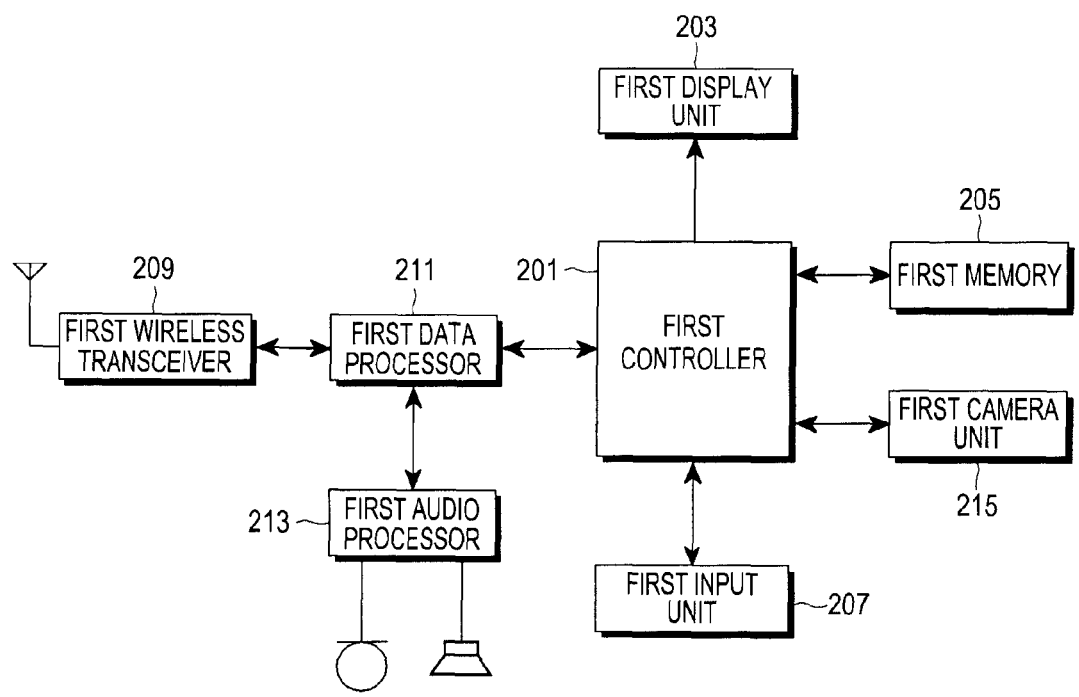
FIG. 2 is a block diagram of a first portable terminal, according to an embodiment of the invention.

FIG. 2 is a block diagram of the first portable terminal 101, according to an embodiment of the invention.

Referring to FIG. 2, the first portable terminal 101 includes a first controller 201 (which may or may not contain a microcontroller and/or a microprocessor), a first display unit 203, a first memory 205, a first input unit 207, a first wireless transceiver 209, a first data processor 211, a first audio processor 213 (which may or may not contain a separate processor), and a first camera unit 215, or any combination thereof.

The first wireless transceiver 209 performs wireless communication functionality of the first portable terminal 101. More specifically, the first wireless transceiver 209 typically includes a wireless transmitter for up converting the frequency of a signal for transmission and amplifying the signal, and a wireless receiver for low-noise amplifying a received signal and down converting the frequency of the received signal. The first data processor 211 typically includes a transmitter for encoding and modulating the signal for transmission, and a receiver for demodulating and decoding the received signal. Here, the first data processor 211 may consist of a modem and a codec, and the codec may have a data codec for, e.g., packet data processing and an audio codec for, e.g., audio signal processing.

The first audio processor 213 reproduces a received audio signal output by the first data processor 211 through a speaker, or transmits an audio signal generated by a microphone to the first data processor 211. The first input unit 207 may have keys for entering information of numbers and characters, and function keys for establishing various functionalities, and the first display unit 203 may display image signals onto a screen and data requested by the first controller unit 201 to be output.

If the first display unit 203 is implemented as a capacitive touchscreen display or a resistive touchscreen display, the first input unit 207 may only include a minimum number of preset keys while the first display unit 203 may take over some of key input functionalities of the first input unit 207. In one embodiment, the first display unit 203 is assumed to be implemented as a touchscreen display.

The first memory 205 typically includes a program memory and a data memory. Most often, the program memory stores a booting system and an operating system (hereinafter, referred to as 'OS') for controlling general operations of the first portable terminal 101, and the data memory stores a plurality of data utilized in the operation of the first portable terminal 101. In this embodiment, the first memory 205 stores at least one of image data.

The first camera unit 215 typically has multiple cameras, each of which captures an object, generates image data, and outputs the image data to the first memory 205 and/or to the first controller 201. The multiple cameras may be forward and backward cameras, the forward camera being placed on the front of the first portable terminal 101 and the backward camera being placed on the rear of the first portable terminal 101.

The first controller 201 controls general operations of the first portable terminal 101. Specifically, the first controller 201 generates first combined data by combining a plurality of image data based on predetermined first combination setting information when requested to perform the video call function, and displays the first combined data through the first display unit 203. The first combination setting information refers to information for generating the first combined data, including size information of the first combined data and position and size information of a plurality of image data included in the first combined data.

The first controller 201 generates second combined data by combining a plurality of image data based on predetermined second combination setting information, and transmits the second combined data to the second portable terminal 105. The second combination setting information refers to information for generating the second combined data, including size information of the second combined data and position, arrangement, and size information of a plurality of image data included in the second combined data.

The first controller 201 receives fourth combined data from the second portable terminal 105 and displays the fourth combined data through the first display unit 203. As such, the first controller 201 provides the video call function for the user by displaying the first combined data and the fourth combined data together.

In the embodiment as described above, channel efficiency is increased by the first controller 201 combining a plurality of image data and transmitting the result. In this embodiment, it is described that a plurality of image data are combined for transmission, but in other embodiments, a plurality of image data may be transmitted on different channels without being combined. In the latter case where a plurality of image data are transmitted on different channels, one of the plurality of image data that is mainly displayed in the second portable terminal 105 may be transmitted on a channel having a relatively better channel condition among the different channels.

The first controller 201 generates a message to give image control authority to the second portable terminal 105 when requested by the user of the first portable terminal 101 for the image control authority while being on the video call with the second portable terminal 105, and transmits the message to the second portable terminal 105. The image control authority refers to authority for the second portable terminal 105 to change the second combined data displayed in the second portable terminal 105, and the message to give the image control authority is a message to indicate that the second portable terminal 105 is given the image control authority. The first controller 201 may also generate a message to withdraw the image control authority when requested by the user of the first portable terminal 1001 for withdrawal of the image control authority, and transmits the message to the second portable terminal 105. The message to withdraw the image control authority is a message to indicate that the image control authority previously given to the second portable terminal 105 is to be withdrawn from the second portable terminal 105.

Upon reception of a change request message from the second portable terminal 105 while being on the video call with the second portable terminal 105, the first controller 201 updates the second combination setting information according to the change request message. The change request message is a message to request for a change of the second combined data (e.g., reduction or expansion of any of a plurality of image data included in the second combined data, and change in positions among a plurality of image data) displayed in the second portable terminal 105. The first controller 201 generates second combined data by combining a plurality of image data based on the updated second combination setting information, and transmits the second combined data to the second portable terminal 105.

When requested by the user of the first portable terminal 101 for a change of the first combined data while being on the video call with the second portable terminal 105, the first controller 201 updates the first combination setting information. The change of the first combined data includes reduction or expansion of any of a plurality of image data included in the second combined data, and position changes among the plurality of image data. Also, the first controller 201 generates first combined data by combining a plurality of image data based on the updated first combination setting information, and displays the first combined data through the first display unit 203.

Figure 3:
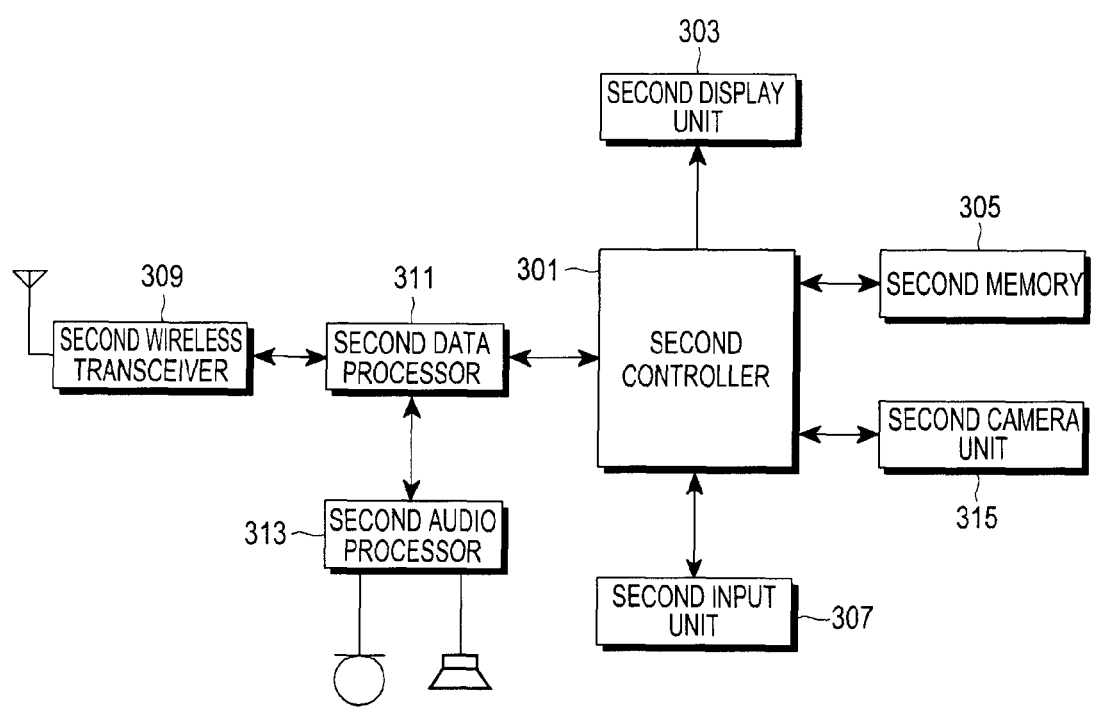
FIG. 3 is a block diagram of a second portable terminal, according to an embodiment of the invention.

FIG. 3 is a block diagram of the second portable terminal 105, according to an embodiment of the invention.

Referring to FIG. 3, the second portable terminal 105 includes a second controller 301 (which may or may not contain a microcontroller and/or a microprocessor), a second display unit 303, a second memory 305, a second input unit 307, a second wireless transceiver 309, a second data processor 311, a second audio processor 313 (which may or may not contain a separate processor), and a second camera unit 315.

The second wireless transceiver 309 performs wireless communication functionality of the second portable terminal 105. More specifically, the second wireless transceiver 309 typically includes a wireless transmitter for up converting the frequency of a signal for transmission and amplifying the signal, and a wireless receiver for low-noise amplifying a received signal and down converting the frequency of the received signal. The second data processor 311 typically includes a transmitter for encoding and modulating the signal for transmission, and a receiver for demodulating and decoding the received signal. Here, the second data processor 311 may consist of a modem and a codec, and the codec may have a data codec for, e.g., packet data processing and an audio codec for, e.g., audio signal processing.

The second audio processor 313 reproduces a received audio signal output by the second data processor 311 through a speaker, or transmits an audio signal generated by a microphone to the second data processor 311. The second input unit 307 may have keys for entering information of numbers and characters, and function keys for establishing various functionalities, and the second display unit 303 may display image signals onto a screen and data requested by the second controller unit 301 to be output.

If the second display unit 303 is implemented as a capacitive touchscreen display or a resistive touchscreen display, the second input unit 307 may only include a minimum number of preset keys while the second display unit 303 may take over some of key input functionalities of the second input unit 307. In this embodiment, the second display unit 303 is assumed to be implemented as the touchscreen display.

The second memory 305 typically includes a program memory and a data memory. Here, the program memory stores a booting system and an operating system (hereinafter, referred to as 'OS') for controlling general operations of the second portable terminal 105, and the data memory stores different data occurred in the operation of the second portable terminal 105. In this embodiment, the second memory 305 stores at least one of image data.

The second camera unit 315 typically has multiple cameras, each of which captures an object, generates image data, and outputs the image data to the second memory 305 or to the second controller 301. The multiple cameras may be forward and backward cameras, the forward camera being placed on the front of the second portable terminal 105 and the backward camera being placed on the rear of the second portable terminal 105.

The second controller 301 controls general operations of the second portable terminal 105. Specifically, the second controller 301 generates third combined data by combining a plurality of image data based on predetermined third combination setting information when requested to perform the video call function, and displays the third combined data through the second display unit 303. The third combination setting information refers to information for generating the third combined data, including size information of the third combined data and position and size information of a plurality of image data included in the third combined data.

The second controller 301 generates the fourth combined data by combining a plurality of image data based on predetermined fourth combination setting information, and transmits the fourth combined data to the first portable terminal 101. The fourth combination setting information refers to information for generating the fourth combined data, including size information of the fourth combined data and position and size information of a plurality of image data included in the fourth combined data.

The second controller 301 receives the second combined data from the first portable terminal 101 and displays the second combined data through the second display unit 303. As such, the second controller 301 provides the video call function for the user by displaying the second combined data and the third combined data together.

In the embodiment as described above, channel efficiency is increased by the second controller 301 combining the plurality of image data and transmitting the result. In this embodiment, it is described that a plurality of image data are combined for transmission, but in other embodiments, a plurality of image data may be transmitted on different channels without being combined. In this case, combination setting information relate to the plurality of image data may be sent with the plurality of image data. The combination setting information may be arrangement information of a plurality of image data for at least a part of each of the plurality of image data to be displayed on a single screen. Accordingly, the combination setting information may include respective image's relative sizes, positions, arrangement place, etc. In the latter case where a plurality of image data are transmitted on different channels, one of the plurality of image data that is mainly displayed in the first portable terminal 101 may be transmitted on a channel having a relatively better channel condition among the different channels.

Upon reception of the message to give the image control authority from the first portable terminal 101 to the second portable terminal 105 while being on the video call with the first portable terminal 101, the second controller 301 determines that the second portable terminal 105 obtains the image control authority for the second combined data. The message to give the image control authority is a message to indicate that the second portable terminal 105 is given the image control authority. Upon reception of the message to withdraw the image control authority from the first portable terminal 101, the second controller 301 determines that the second portable terminal 105 loses the image control authority for the second combined data. The message to withdraw the image control authority is a message to indicate that the image control authority previously given to the second portable terminal 105 is to be withdrawn from the second portable terminal 105.

Furthermore, when requested by the user for a change of the second combined data while being on the video call with the first portable terminal 101, the second controller 301 generates the change request message, and transmits the change request message to the first portable terminal 101 through the wireless communication network 103. The change request message is a message to request for a change of the second combined data (e.g., reduction or expansion of any of a plurality of image data included in the second combined data, and change in positions among a plurality of image data) displayed in the second display unit 303. The second controller 301 receives the second combined data generated according to the change request of the user of the second portable terminal 105 from the first portable terminal 101, and displays the second combined data.

When requested by the user for a change of the third combined data while being on the video call with the first portable terminal 101, the second controller 301 updates the third combination setting information. The change of the third combined data includes reduction or expansion of any of a plurality of image data included in the third combined data, and position changes among the plurality of image data. Also, the second controller 301 generates third combined data by combining a plurality of image data based on the updated third combination setting information, and displays the third combined data through the second display unit 303.

Figure 4:
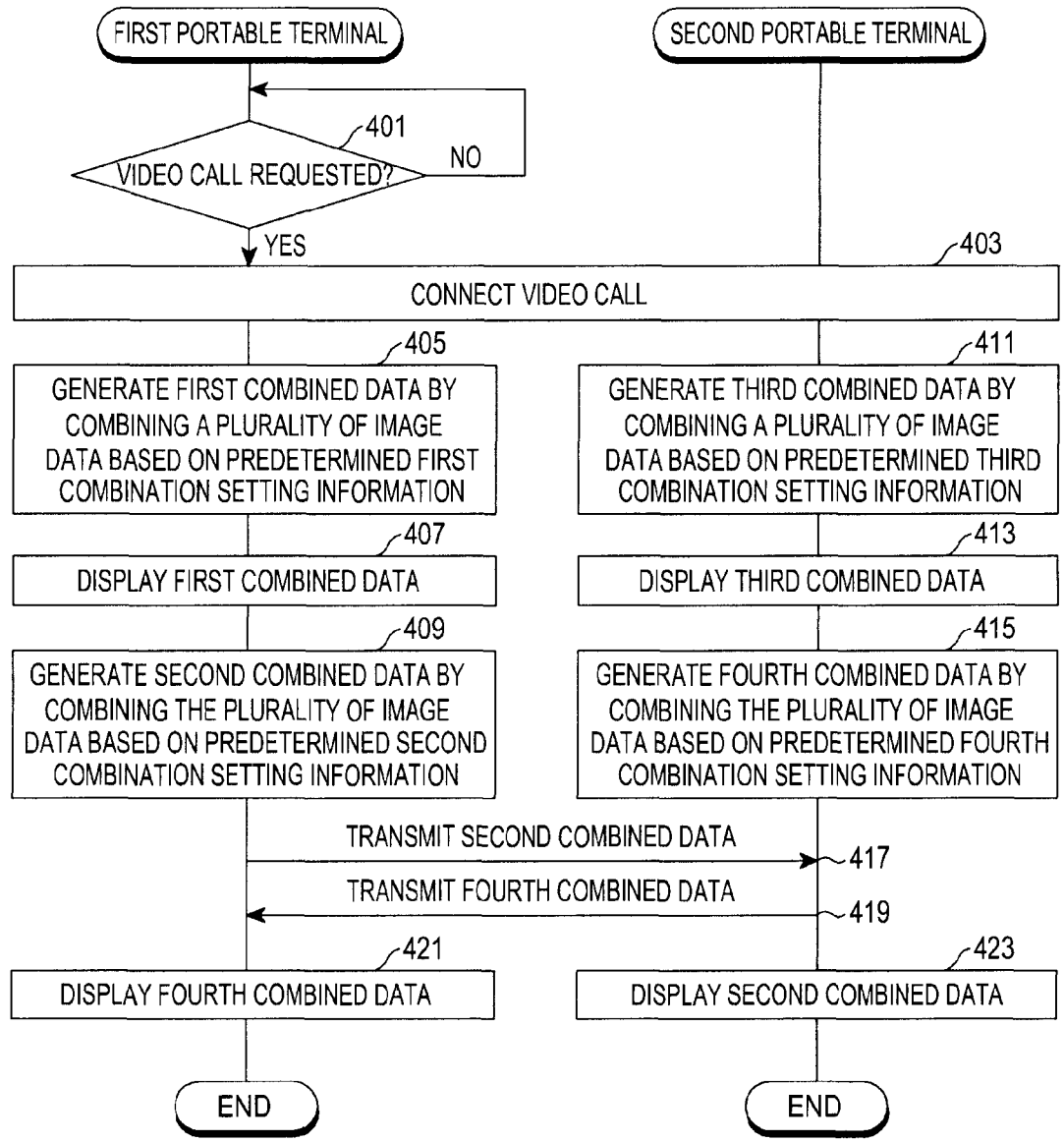
FIG. 4 is a flowchart illustrating a process of providing a video call in a communication system, according to an embodiment of the invention.

FIG. 4 is a flowchart illustrating a process of providing a video call in the communication system, according to an embodiment of the invention.

Referring to FIG. 4, the first portable terminal 101 determines whether a video call is requested by the user, at 401. If it is determined that the video call is requested, the first portable terminal 101 proceeds to 403, or otherwise, repeats the 401. In the embodiment the video call is requested by the user of the first portable terminal 101, but in other embodiments the user of the second portable terminal 105 may request the video call.

At 403, the first portable terminal 101 makes the video call with the second portable terminal 105 and proceeds to 405. The first portable terminal 101 generates first combined data by combining a plurality of image data of the first portable terminal 101 based on predetermined first combination setting information at 405, displays the first combined data at 407, and proceeds to 409. The first combination setting information refers to information for generating the first combined data, including size information of the first combined data and position and size information of a plurality of image data included in the first combined data. The plurality of image data of the first portable terminal 101 may be stored in the first memory 205 of the first portable terminal 101 beforehand or may be generated by the first camera unit 215 on the spot.

The first portable terminal 101 generates second combined data by combining a plurality of image data (which may be the same or different from the first combined data) of the first portable terminal 101 based on predetermined second combination setting information at 409, and proceeds to 417. The second combination setting information refers to information for generating the second combined data, including size information of the second combined data and position and size information of a plurality of image data included in the second combined data.

The first portable terminal 101 generates the first combined data or the second combined data by combining a plurality of image data of the first portable terminal 101. The first combined data is image data to be displayed in the first portable terminal 101, and the second combined data is image data to be displayed in the second portable terminal 105. If the first combination setting information and the second combination setting information are the same, the first combined data and the second combined data are the same; otherwise, if the first combination setting information and the second combination setting information are different from each other, the first combined data and the second combined data are different from each other.

The second portable terminal 105 generates third combined data (much as the first portable terminal 101 generates the first combined data) by combining a plurality of image data of the second portable terminal 101 based on predetermined third combination setting information at 411, displays the third combined data at 413, and proceeds to 415. The third combination setting information refers to information for generating the third combined data, including size information of the third combined data and position and size information of a plurality of image data included in the third combined data. The plurality of image data of the second portable terminal 105 may be stored in the second memory 305 of the second portable terminal 105 beforehand or may be generated by the second camera unit 315 on the spot.

The second portable terminal 105 generates fourth combined data (much as the first portable terminal generates the second combined data) by combining a plurality of image data of the second portable terminal 105 based on predetermined fourth combination setting information at 415, and proceeds to 419. The fourth combination setting information refers to information for generating the fourth combined data, including size information of the fourth combined data and position and size information of a plurality of image data included in the fourth combined data.

The second portable terminal 105 generates the third combined data or the fourth combined data by combining a plurality of image data of the second portable terminal 105. The third combined data is image data to be displayed in the second portable terminal 105, and the fourth combined data is image data to be displayed in the first portable terminal 101. If the third combination setting information and the fourth combination setting information are the same, the third combined data and the fourth combined data are the same; otherwise, if the third combination setting information and the fourth combination setting information are different from each other, the third combined data and the fourth combined data are different from each other.

The first portable terminal 101 transmits the second combined data to the second portable terminal 105 at 471, and the second portable terminal 105 transmits the fourth combined data to the first portable terminal 101 at 419. The first portable terminal 101 receives and displays the fourth combined data at 421, and the second portable terminal 105 receives and displays the second combined data at 423.

More particularly, the first portable terminal 101 provides the video call for the user of the first portable terminal 101 by displaying the first combined data, which is combined image data of the first portable terminal 101, and the fourth combined data, which is combined image data of the second portable terminal 105. The second portable terminal 105 provides the video call for the user of the second portable terminal 105 by displaying the third combined data, which is combined image data of the second portable terminal 105, and the second combined data, which is combined image data of the first portable terminal 101.

Figure 5:
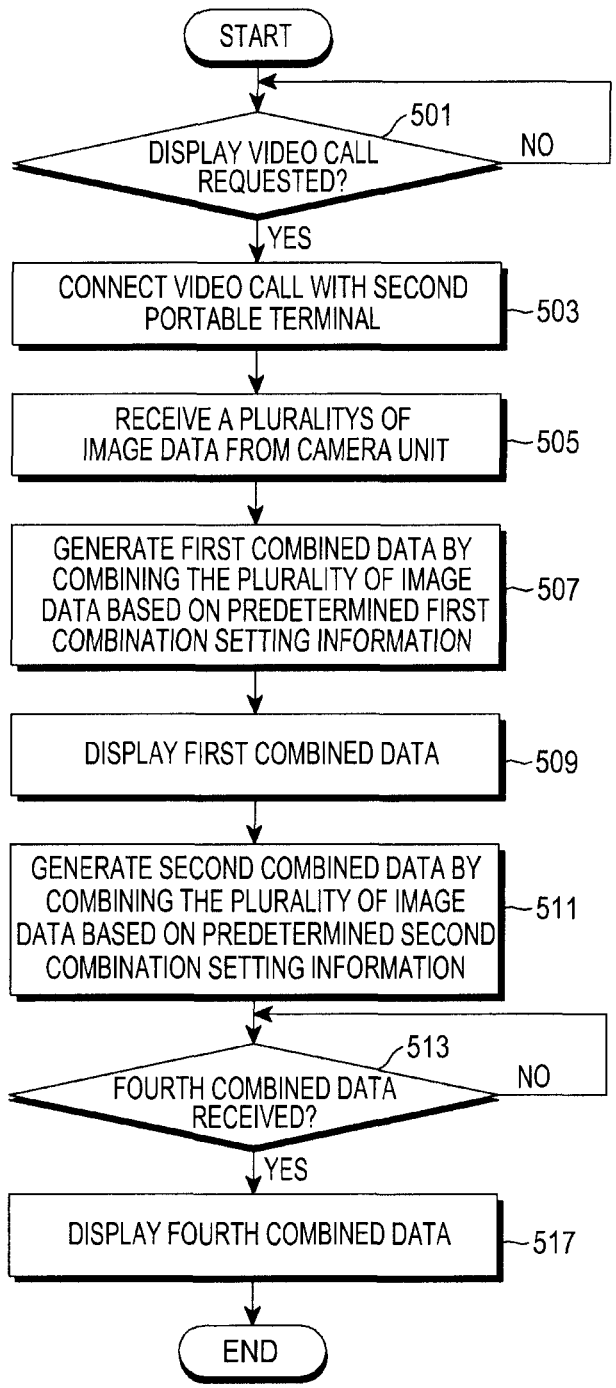
FIG. 5 is a flowchart illustrating a process of providing a video call in a first portable terminal, according to an embodiment of the invention.

FIG. 5 is a flowchart illustrating a process of providing a video call in the first portable terminal 101, according to one non-limiting embodiment of the invention.

The first controller 201 of the first portable terminal 101 determines whether a video call is requested by the user, at 501. If it is determined that the video call is requested, the first controller 201 proceeds to 503, or otherwise, repeats 501.

At 503, the first controller 201 makes the video call with the second portable terminal 105 and proceeds to 505. The first controller 201 receives a plurality of image data captured on the spot by the plurality of cameras of the first camera unit 215 at 505, and generates first combined data by combining the plurality of image data based on the predetermined first combination setting information at 507. The first controller 201 displays the first combined data in a predetermined first area of the first display unit 203 at 509, and proceeds to 511.

Any of the predetermined data used in any embodiment of the invention, including, predetermined first combination setting and the predetermined first area, may independently be set by a user or be coded into the OS.

The first controller 201 generates second combined data by combining the plurality of image data based on the predetermined second combination setting information and transmits the second combined data to the second portable terminal 105, at 511, and proceeds to 513.

At 505 to 511, the first controller 201 generates the first combined data or the second combined data by combining the plurality of image data. The first combined data is image data to be displayed in the first portable terminal 101, and the second combined data is image data to be displayed in the second portable terminal 105. If the first combination setting information and the second combination setting information are the same, the first combined data and the second combined data are the same; otherwise, if the first combination setting information and the second combination setting information are different from each other, the first combined data and the second combined data are different from each other.

At 513, the first controller 201 determines whether fourth combined data is received from the second portable terminal 105. The fourth combined data refers to combined image data which is generated by the second portable terminal 105 for the video call.

If it is determined that the fourth combined data is received, the first controller 201 proceeds to 517, or otherwise, repeats the 513. At 517, the first controller 201 displays the fourth combined data in a predetermined second area of the first display unit 201. Although in preferred embodiments the first area and the second do not overlap each other, such overlap is not prohibited by the invention.

Figure 6A:
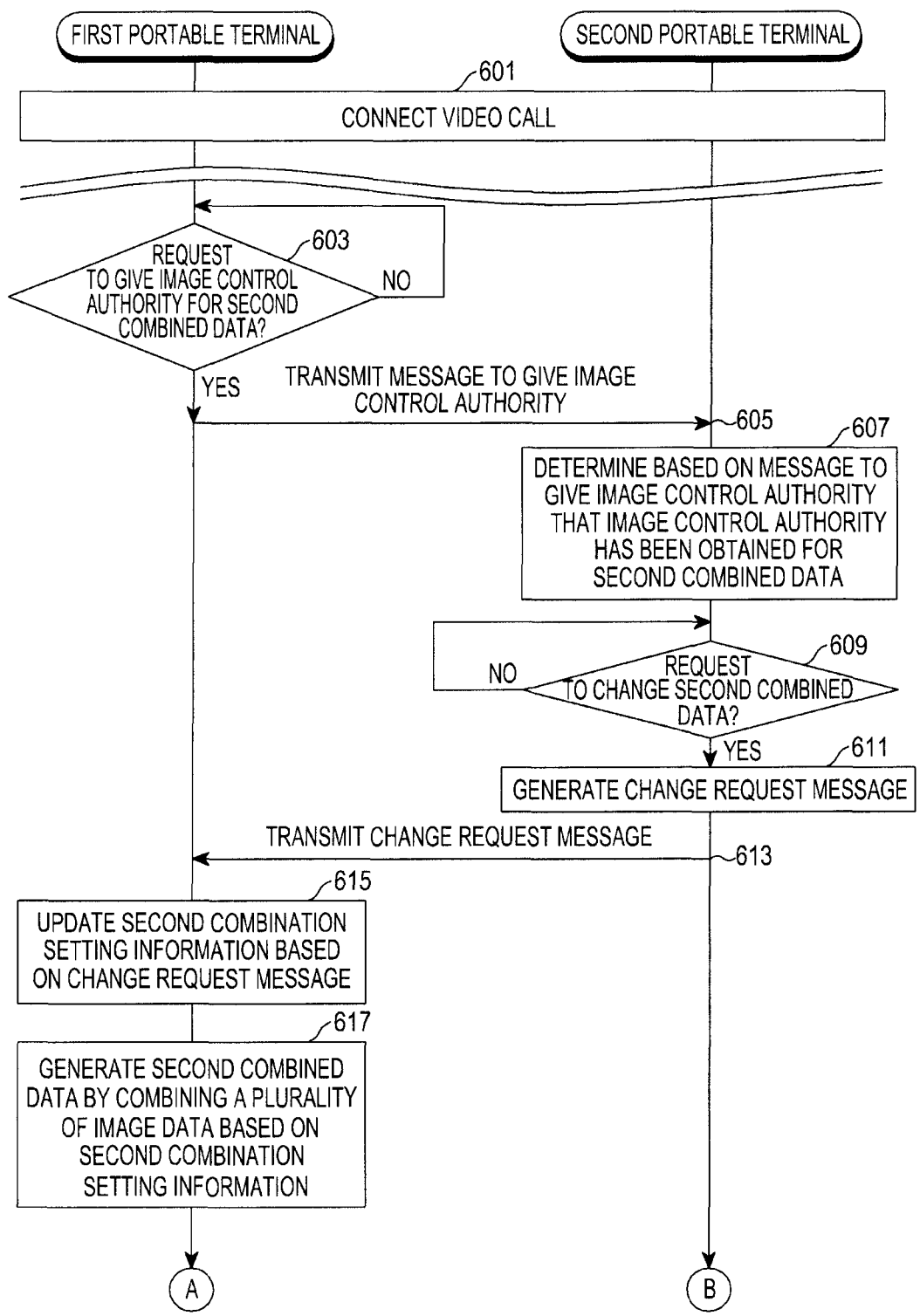
FIG. 6A and FIG. 6B are flowcharts illustrating a process of providing authority to control image data in a communication system, according to an embodiment of the invention.
Figure 6B:
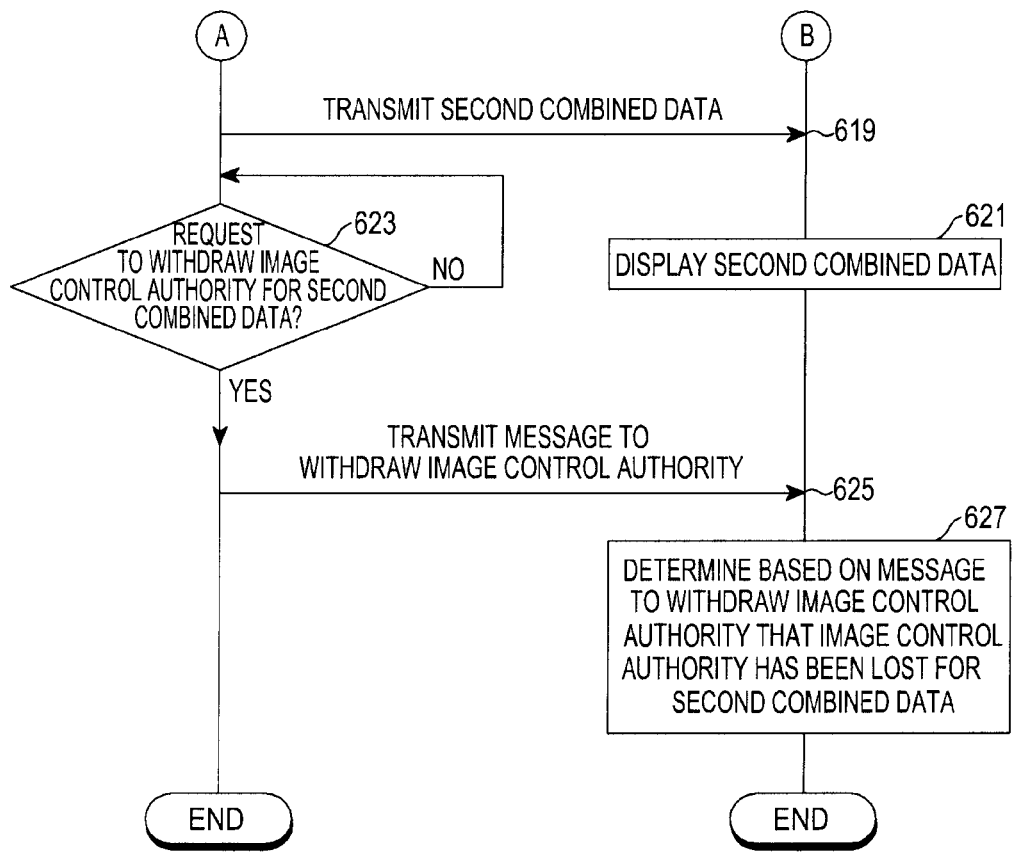

FIGS. 6A and 6B are flowcharts illustrating a process of providing authority to control image data in the communication system, according to an embodiment of the invention.

Referring to FIGS. 6A and 6B, at 601, the first portable terminal 101 makes the video call with the second portable terminal 105 and proceeds to 603. The first portable terminal 101 displays the first combined data and the received fourth combined data simultaneously on first display unit 203, and the second portable terminal 105 displays the second combined data and the received third combined data simultaneously on display unit 303. At 603, the first portable terminal 101 determines whether the image control authority for the second combined data is requested by the user of the first portable terminal. If it is determined that the image control authority is requested, the first portable terminal 101 proceeds to 605, otherwise, repeats 603.

At 605, the first portable terminal 101 generates a message to give the image control authority and transmits the message to the second portable terminal 105, and proceeds to 607. The image control authority refers to authority for the user of the second portable terminal 105 to change the second combined data displayed in the second portable terminal 105, and the message to give the image control authority is a message to indicate that the image control authority is given for the second combined data. Effectively, the request to give image control authority grants the user of the second terminal 105 the ability to control the second combined data generated by the first terminal 101 and transmitted to the second terminal 105.

At 607, the second portable terminal 105 receives the message to give the image control authority to the second portable terminal 105 and determines based on the message that the image control authority for the second combined data has been obtained, and proceeds to 609.

At 609, the second portable terminal 105 determines whether a change of the second combined data is requested by the user. If it is determined that the change of the second combined data is requested, the second portable terminal 105 proceeds to 611, or otherwise, repeats the 609. The change of the second combined data can include, for example, reduction or expansion of any of a plurality of image data included in the second combined data, and position changes among the plurality of image data.

When an optionally preset gesture of the user is input or a menu is selected by the user, the second portable terminal 105 determines that the change of the second combined data is requested. In one embodiment, if a gesture to request expansion of any of the plurality of image data included in the second combined data is input by a user of the second portable terminal 105, the second portable terminal 105 may determine that a request for expansion of the second combined data has been made. In another embodiment, if an expansion menu to request expansion of any of the plurality of image data included in the second combined data is selected from among a plurality of menus (expansion, reduction, capture, etc.), the second portable terminal 105 may determine that expansion of the second combined data has been requested.

In 611, the second portable terminal 105 generates a change request message at the request for the change of the second combined data at 611, transmits the change request message to the first portable terminal 101 (613), and proceeds to 615. More particularly, if the request for the change of the second combined data is a request for expansion of the first image data among the plurality of image data included in the second combined data, the second portable terminal 105 may generate the change request message to request for expansion of the first image data.

At 615, the first portable terminal 101 receives the change request message from the second portable terminal 105 and updates the second combination setting information based on the change request message, and proceeds to 617. More particularly, if the change request message is requesting for expansion of the second image data, the first portable terminal 101 may change size information of the second image data included in the second combination setting information in order to expand the second image data at predetermined magnification.

The first portable terminal 101 generates second combined data by combining the plurality of image data based on the updated second combination setting information at 617, transmits the second combined data to the second portable terminal 105 at 619. At 621, the second portable terminal 105 receives the second combined data generated based on the request for a change of the second combined data and displays the second combined data in a second area of the second display unit 303.

At 623, the first portable terminal 101 determines whether withdrawal of the image control authority is requested by the user of the first portable terminal 101. If it is determined that withdrawal of the image control authority is requested, the first portable terminal 101 proceeds to 625, or otherwise, repeats the 623. Effectively, the image control authority remains with the second portable terminal 105 until the first portable terminal 101 requests that the image control authority be returned to the first portable terminal. In a preferred embodiment, the request to return the image control authority would be at the direction of the user of the first portable terminal, however it is considered within the scope of the invention to allow the return to occur at the direction of the first portable terminal 101 without input of the user, e.g., in response to internal processing requirements or changes in the bandwidth available through the wireless network 103.

At 625, the first portable terminal 101 generates a message to withdraw the image control authority and transmits the message to the second portable terminal 105. The message to withdraw the image control authority is a message to indicate that the image control authority given to the second portable terminal 105 for the second combined data is to be withdrawn from the second portable terminal 105 and returned to the first portable terminal 101. At 627, the second portable terminal 105 receives the message to withdraw the image control authority from the first portable terminal 101 and determines based on the message that the image control authority for the second combined data has been lost.

Figure 7:
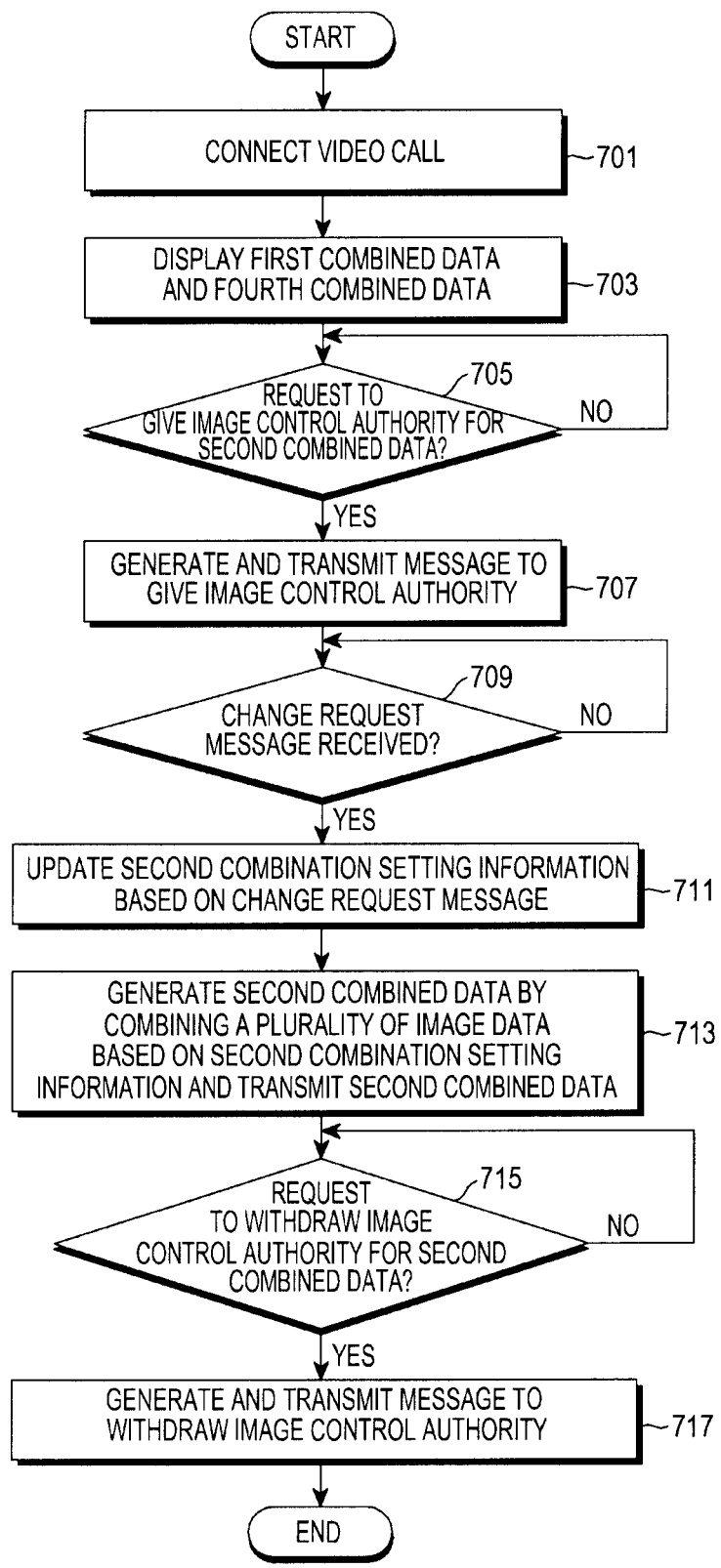
FIG. 7 is a flowchart illustrating a process of providing authority to control image data in a first portable terminal, according to an embodiment of the invention.

FIG. 7 is a flowchart illustrating a process of providing authority to control image data in the first portable terminal 101, according to one embodiment of the invention.

At 701, the first controller 201 makes a video call with the second portable terminal 105, displays first combined data and fourth combined data together at 703, and proceeds to 705. At 705, the first controller 201 determines whether the image control authority for second combined data is requested by the user. If it is determined that the image control authority is requested, the first controller 201 proceeds to 707, or otherwise, repeats the 705.

At 707, the first controller 201 generates a message to give the image control authority and transmits the message to the second portable terminal 105. The message to give the image control authority is a message to indicate that the image control authority is given for the second combined data.

At 709, the first controller 201 determines whether a change request message is received from the second portable terminal 105. If it is determined that the change request message is received, the first controller 201 proceeds to 711, or otherwise, repeats 709.

At 711, the first controller 201 updates second combination setting information based on the change request message. More particularly, if the change request message is requesting for expansion of the second image data, the first controller 201 may change size information of the second image data included in the second combination setting information in order to expand the second image data at predetermined magnification.

At 713, the first controller 201 generates second combined data by combining the plurality of image data based on the updated second combination setting information, and transmits the second combined data to the second portable terminal 105.

At 715, the first controller 201 determines whether withdrawal of the image control authority is requested by the user. If it is determined that withdrawal of the image control authority is requested, the first controller 201 proceeds to 717, or otherwise, repeats 715.

At 717, the first controller 201 generates a message to withdraw the image control authority and transmits the message to the second portable terminal 105. The message to withdraw the image control authority is a message to indicate that the image control authority given to the second portable terminal 105 for the second combined data is to be withdrawn from the second portable terminal 105.

Figure 8:
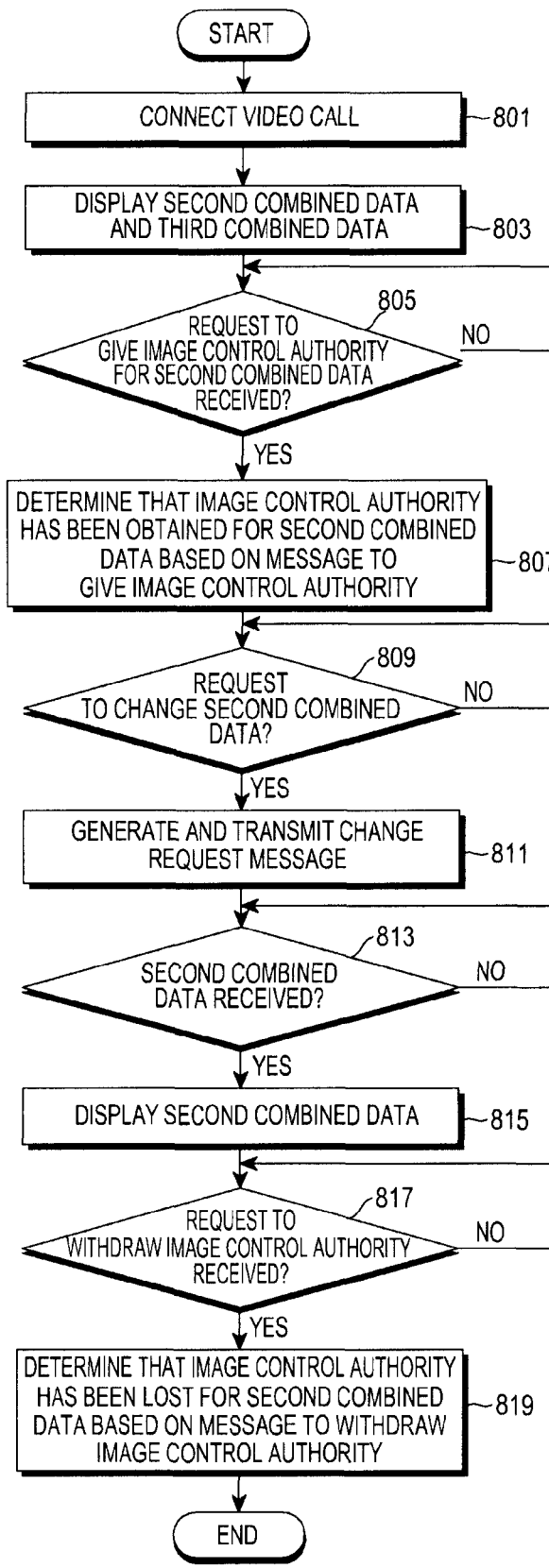
FIG. 8 is a flowchart illustrating a process of providing authority to control image data in a second portable terminal, according to an embodiment of the invention.

FIG. 8 is a flowchart illustrating a process of providing authority to control image data in the second portable terminal 105, according to an embodiment of the invention.

Referring to FIG. 8, the second controller 301 makes a video call with the first portable terminal 101 at 801, and displays second combined data and third combined data together at 803.

At 805, the second controller 301 determines whether the message to give image control authority is received from the first portable terminal 101. If the message to give the image control authority is received, the second controller 301 proceeds to 807, or otherwise, proceeds to 805. The message to give the image control authority is a message to indicate that the image control authority is given for the second combined data.

At 807, the second controller 301 determines based on the message to give the image control authority that the image control authority for the second combined data has been obtained.

At 809, the second controller 301 determines whether a change of the second combined data is requested by the user. If it is determined that the change of the second combined data is requested, the second controller 301 proceeds to 811, or otherwise, proceeds to 809. The change of the second combined data includes reduction or expansion of any of a plurality of image data included in the second combined data, and position changes among the plurality of image data.

When a preset gesture of the user is input or a menu is selected by the user, the second controller 301 determines that the change of the third combined data is requested. In one embodiment, if a gesture preset to request expansion of any of the plurality of image data included in the second combined data is input, the second controller 301 may determine that a request for expansion of the second combined data has been made. In another embodiment, if an expansion menu to request expansion of any of the plurality of image data included in the second combined data is selected from among a plurality of menus (expansion, reduction, capture, etc.), the second controller 301 may determine that expansion of the second combined data has been requested.

At 811, the second controller 301 generates a change request message at the request for the change of the second combined data, transmits the change request message to the first portable terminal 101, and proceeds to 813. More particularly, if the request for the change of the second combined data is a request for expansion of the first image data among the plurality of image data included in the second combined data, the second controller 301 may generate the change request message to request for expansion of the first image data.

At 813, the second controller 301 determines whether the second combined data is received from the first portable terminal 101 in response to the change request message. If it is determined that the second combined data is received, the second controller 301 proceeds to 815, or otherwise, proceeds to 813. At 815, the second controller 301 displays the second combined data, and proceeds to 817.

At 817, the second controller 301 determines whether the message to withdraw the image control authority is received from the first portable terminal 101. The message to withdraw the image control authority is a message to indicate that the image control authority given to the second portable terminal 105 for the second combined data is to be withdrawn from the second portable terminal 105. If it is determined that the message to withdraw the image control authority is received, the second controller 301 proceeds to 819, or otherwise, repeats the 817.

At 819, the second controller 301 determines based on the message to withdraw the image control authority that the image control authority for the second combined data has been lost.

Figure 9:
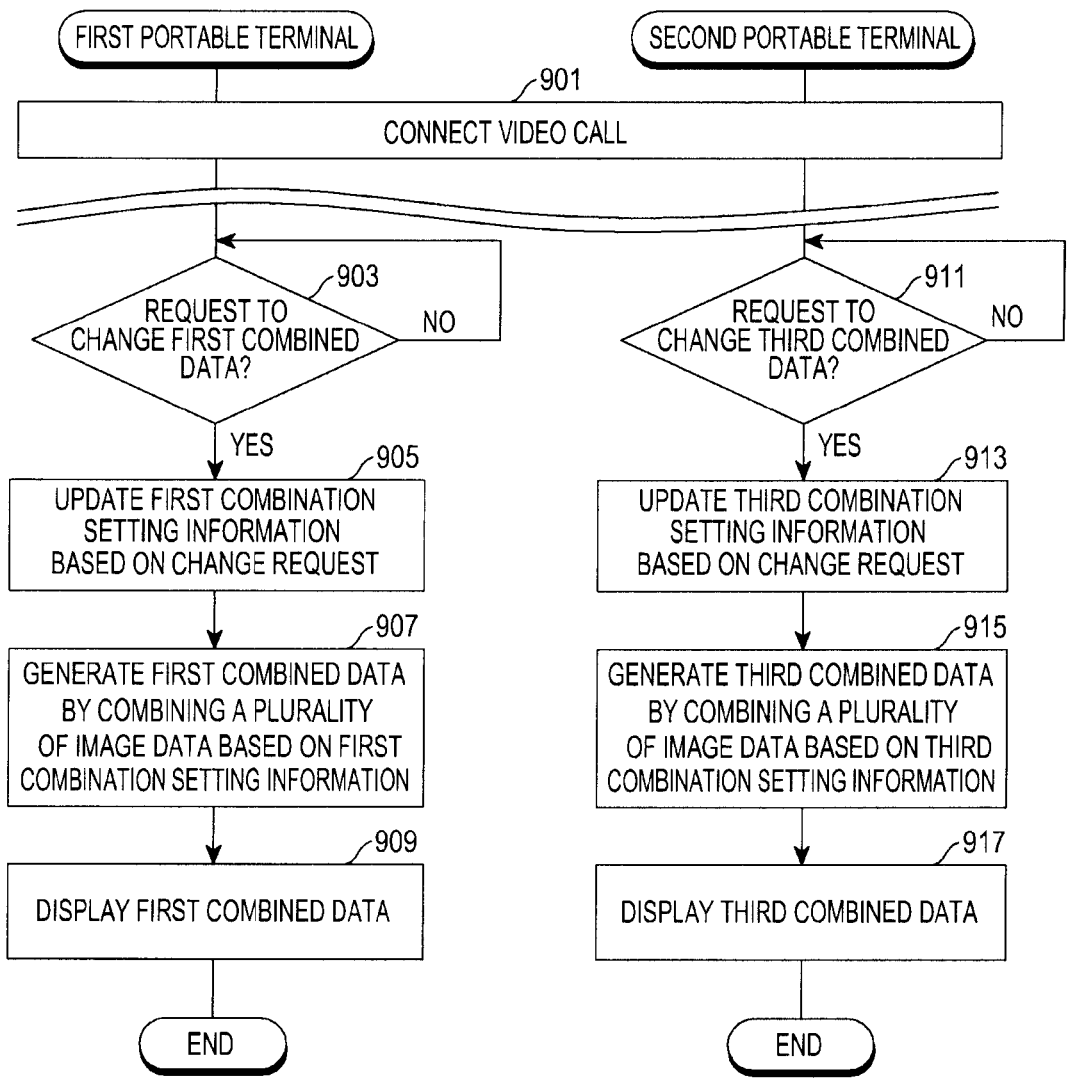
FIG. 9 is a flowchart illustrating a process of changing image data in a communication system, according to an embodiment of the invention.

FIG. 9 is a flowchart illustrating a process of changing image data in the communication system, according to one embodiment of the invention.

Referring to FIG. 9, the first portable terminal 101 makes the video call with the second portable terminal 105 at 901 and proceeds to 903. The first portable terminal 101 displays the first combined data and the fourth combined data (received from the second portable terminal 105) together, and the second portable terminal 105 displays the second combined data and the third combined data (received from the first portable terminal 101) together.

At 903, the first portable terminal 101 determines whether a change of the first combined data is requested by the user. If it is determined that the change of the first combined data is requested, the first portable terminal 101 proceeds to 905, or otherwise, returns to 903.

At 905, the first portable terminal 101 updates the first combination setting information at the request to change the first combined data, and proceeds to 907. The change of the first combined data may include reduction or expansion of any of a plurality of image data included in the first combined data, and position changes among the plurality of image data.

The first portable terminal 101 additionally preferably generates first combined data by combining a plurality of image data based on the updated first combination setting information at 907, and displays the first combined data on the first display unit 203 at 909.

At 911, the second portable terminal 105 determines whether a change of the third combined data is requested by the user. If it is determined that the change of the third combined data is requested, the second portable terminal 105 proceeds to 913, or otherwise, repeats 911.

At 913, the second portable terminal 105 updates third combination setting information at the data change request, and proceeds to 915. The change of the third combined data includes reduction or expansion of any of a plurality of image data included in the third combined data, and position changes among the plurality of image data.

The second portable terminal 105 additionally preferably generates third combined data by combining a plurality of image data based on the updated third combination setting information at 915, and displays the third combined data at 917.

Figure 10:
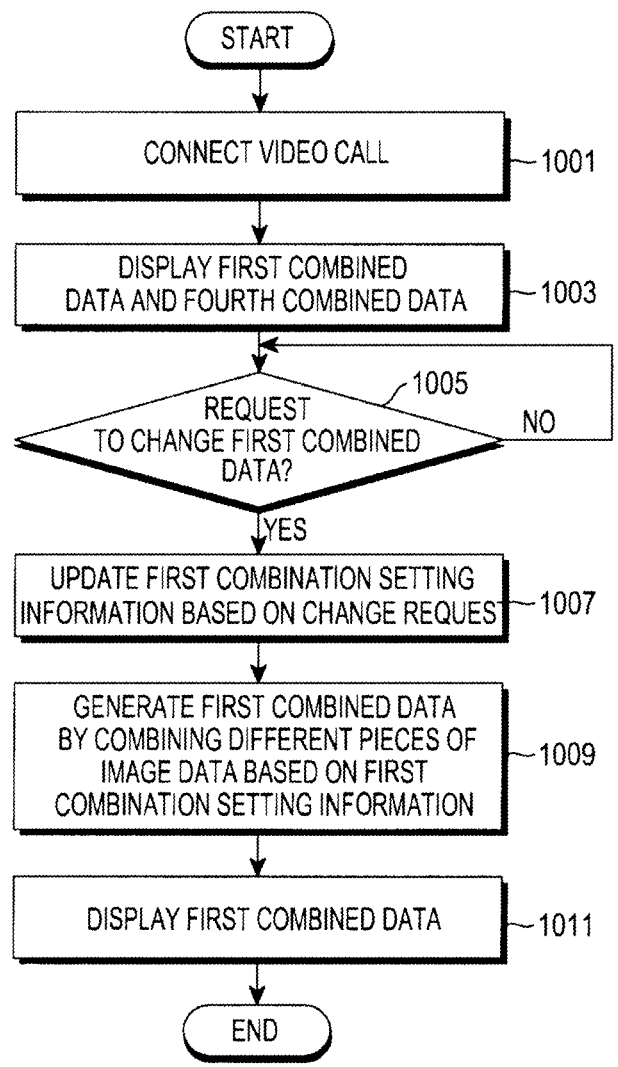
FIG. 10 is a flowchart illustrating a process of changing image data in a first portable terminal, according to an embodiment of the invention.

FIG. 10 is a flowchart illustrating a process of changing image data in the first portable terminal 101, according to one embodiment of the invention.

Referring to FIG. 10, the first controller 201 makes a video call with the second portable terminal 105 at 1001, displays first and fourth combined data together at 1003, and proceeds to 1005.

At 1005, the first controller 201 determines whether a change of the first combined data is requested by the user. If it is determined that the change of the first combined data is requested, the first controller 201 proceeds to 1007, or otherwise, proceeds back to 1005.

At 1007, the first controller 201 updates the first combination setting information based on the request to change the first combined data, and proceeds to 1009. The change of the first combined data includes reduction or expansion of any of a plurality of image data included in the first combined data, and position changes among the plurality of image data.

Also, the first controller 201 generates first combined data by combining a plurality of image data based on the updated first combination setting information at 1009, and displays the first combined data at 1011.

Figure 11:
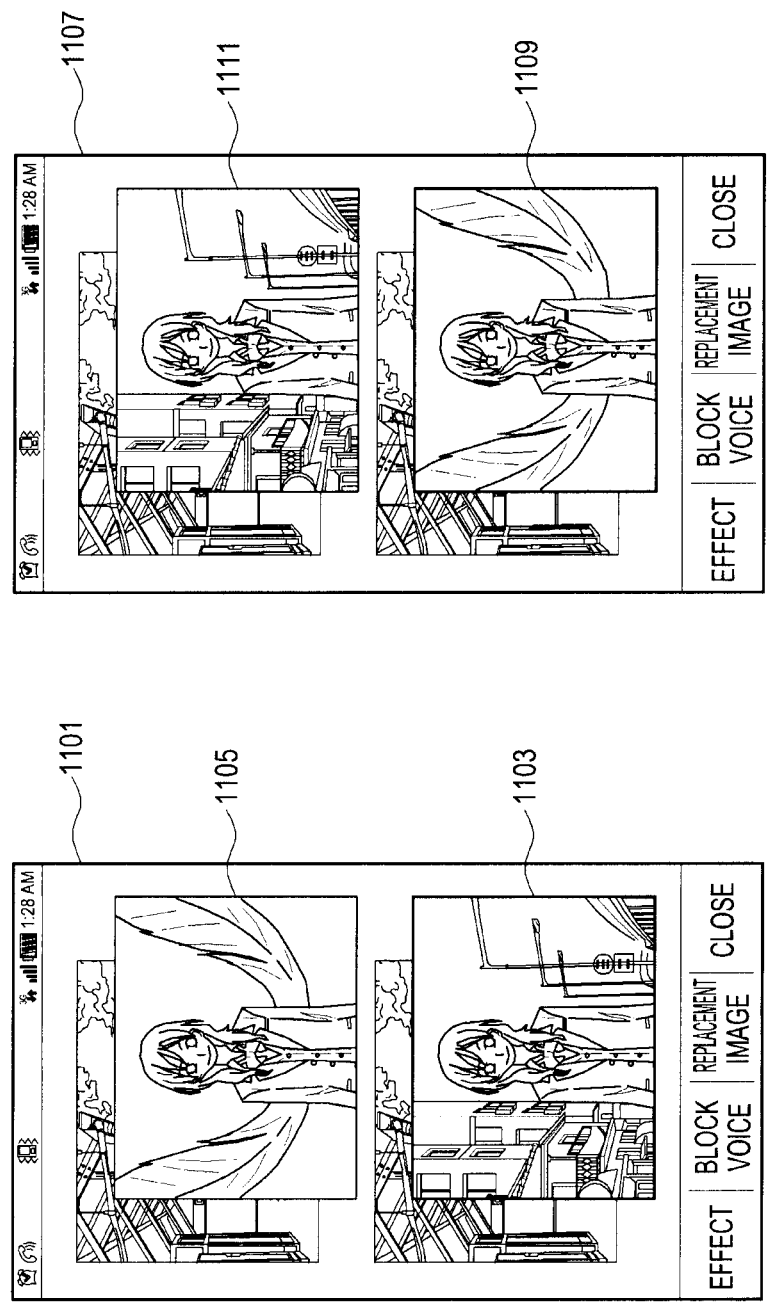
FIG. 11 illustrates screens to display image data, according to an embodiment of the invention.

FIG. 11 illustrates screens to display image data, according to one embodiment of the invention.

Referring to FIG. 11, the first portable terminal 101 displays first combined data 1103 obtained by combining a plurality of image data generated by the first portable terminal 101 in a predetermined first area, and displays fourth combined data 1105 obtained by combining a plurality of image data generated by the second portable terminal 105 in a predetermined second area, as shown in a screen 1101.

The second portable terminal 105 displays third combined data 1109 obtained by combining a plurality of image data generated by the second portable terminal 105 in a predetermined third area, and displays second combined data 1107 obtained by combining a plurality of image data generated by the first portable terminal 101 in a predetermined fourth area, as shown in a screen 1107.

Figure 12:
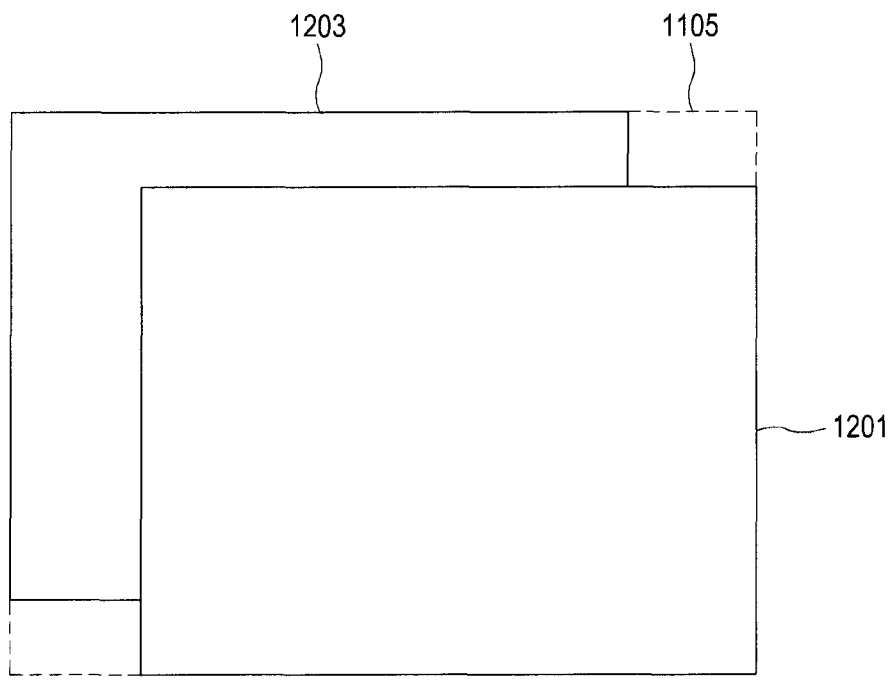
FIG. 12 illustrates an arrangement of image data, according to an embodiment of the invention.

FIG. 12 illustrates an arrangement of image data, according to one embodiment of the invention.

Referring to FIG. 12, the fourth combined data 1105 is obtained by combining first image data 1201 and second image data 1203 in layers. In one embodiment, the first controller 201 may combine the first and second image data 1201 and 1203 such that the first image data 1201 is followed by the second image data 1203. In another embodiment, the first controller 201 may combine the first and second image data 1203 and 1201 such that the second image data 1203 is followed by the first image data 1201. The first image data 1201 and the second image data 1203 may be combined in an arranged condition such that at least parts of them may be displayed on a screen.

Accordingly, combined image data may be configured such that at least a part of each of the plurality of image data, which is included in the combined image data may be displayed on a screen.

In FIG. 12, only the fourth combined data 1105 is described to be combined in layers, but it will be appreciated that the first and third combined data may also be each combined in layers.

Figure 13A:
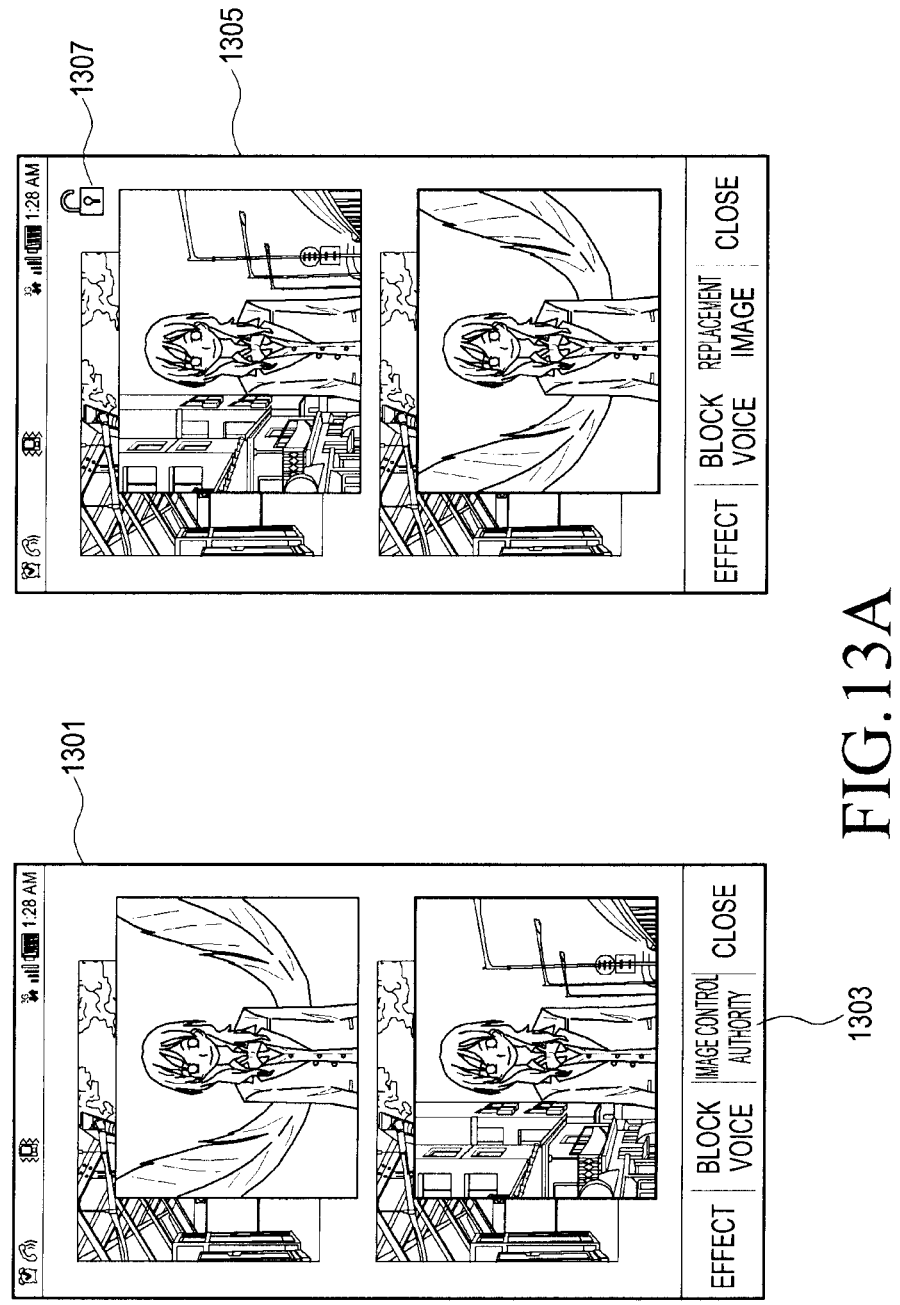
FIG. 13A and FIG. 13B illustrate screens to present displays about whether to provide authority to control image data, according to an embodiment of the present invention.
Figure 13B:
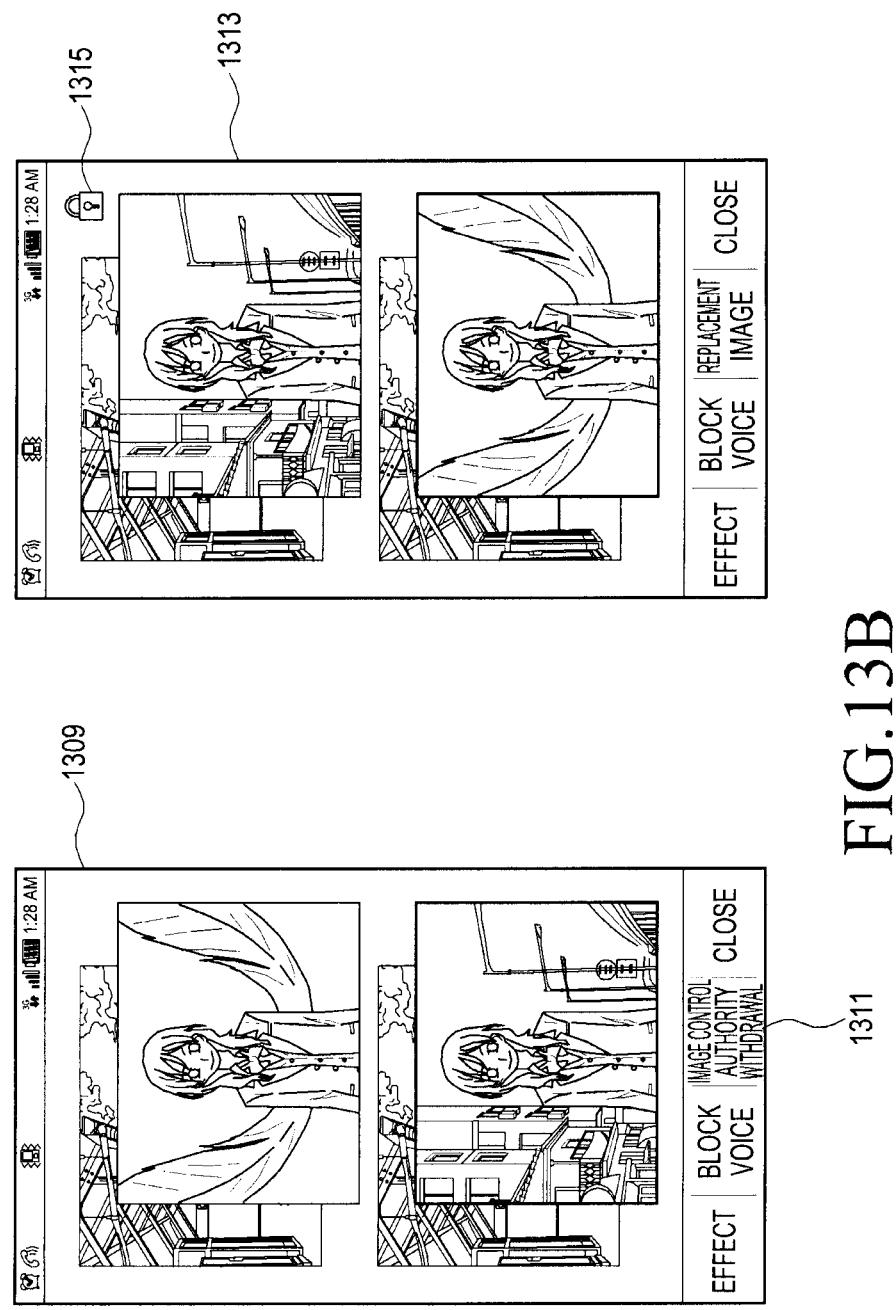

FIGS. 13A and 13B illustrate screens to present displays about whether to provide authority to control image data, according to an embodiment of the present invention.

Referring to FIGS. 13A and 13B, the first portable terminal 101 displays a menu 1303 to give the second portable terminal 105 image control authority for second combined data, as shown in a screen 1301. If the user of the first portable terminal 101 selects the menu to give the image control authority to the second portable terminal 105, the first portable terminal 101 transmits a message to give the image control authority to the second portable terminal 105.

The second portable terminal 105 receives the message to give the image control authority from the first portable terminal 101 and determines based on the message that the image control authority for the second combined data has been given. The second portable terminal 105 generates and preferably displays an icon 1307 to represent that the image control authority has been given, as shown in a screen 1305. Although displayed herein as an unlocked lock, the icon 1307 may be displayed in any other feature that represents that the image control authority has been given.

Thereafter, the first portable terminal 101 displays a menu 1311 to withdraw the image control authority for the second combined data from the second portable terminal 105, as shown in a screen 1309, as shown in a screen 1309. If the user of the first portable terminal 101 selects the menu 1311 to withdraw the image control authority, the first portable terminal 101 transmits a message to withdraw the image control authority to the second portable terminal 105.

The second portable terminal 105 receives the message to withdraw the image control authority from the first portable terminal 101 and determines based on the message that the image control authority for the second combined data has been lost. The second portable terminal 105 generates and preferably displays an icon 1315 to represent that the image control authority has been lost, as shown in a screen 1313. Although displayed herein as a locked lock, the icon 1307 may be displayed in any other feature that represents that the image control authority has been lost.

Figure 14A:
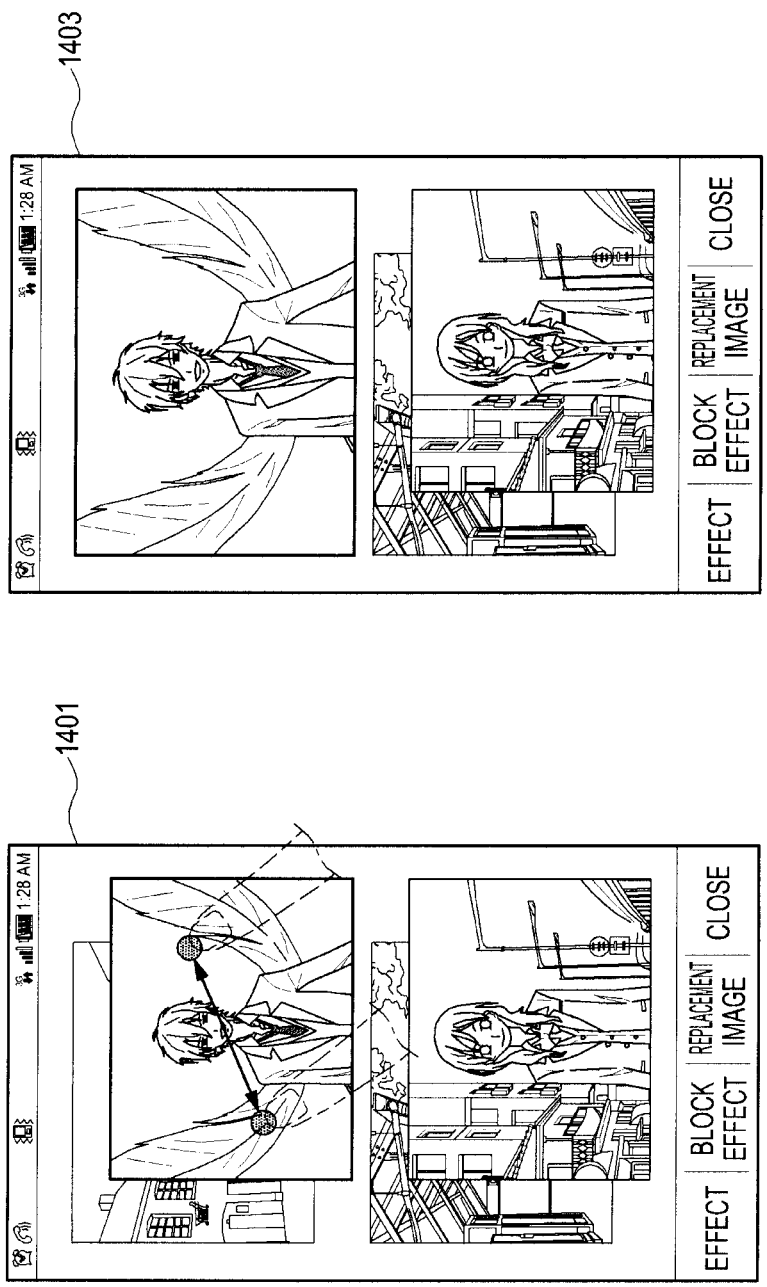
FIG. 14A, FIG. 14B and FIG. 14C illustrate screens to change the other party's image data, according to an embodiment of the invention.
Figure 14B:
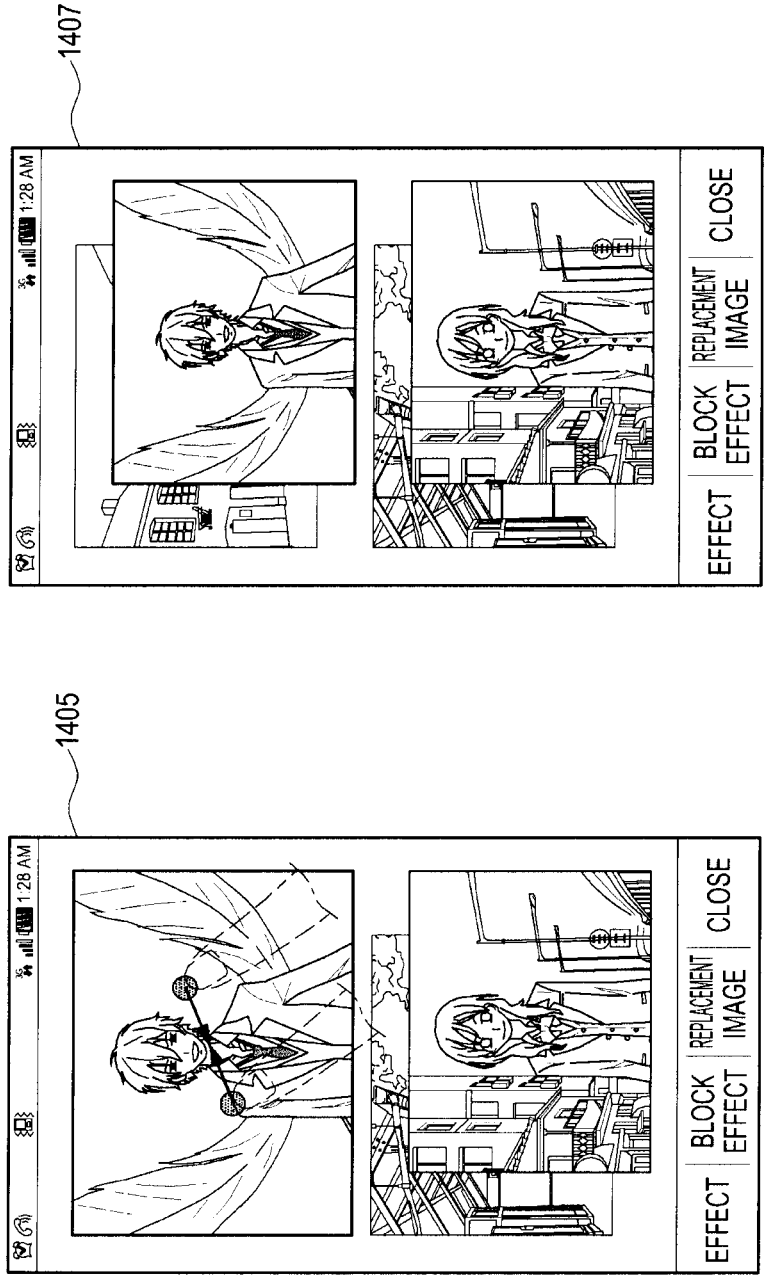
Figure 14C:
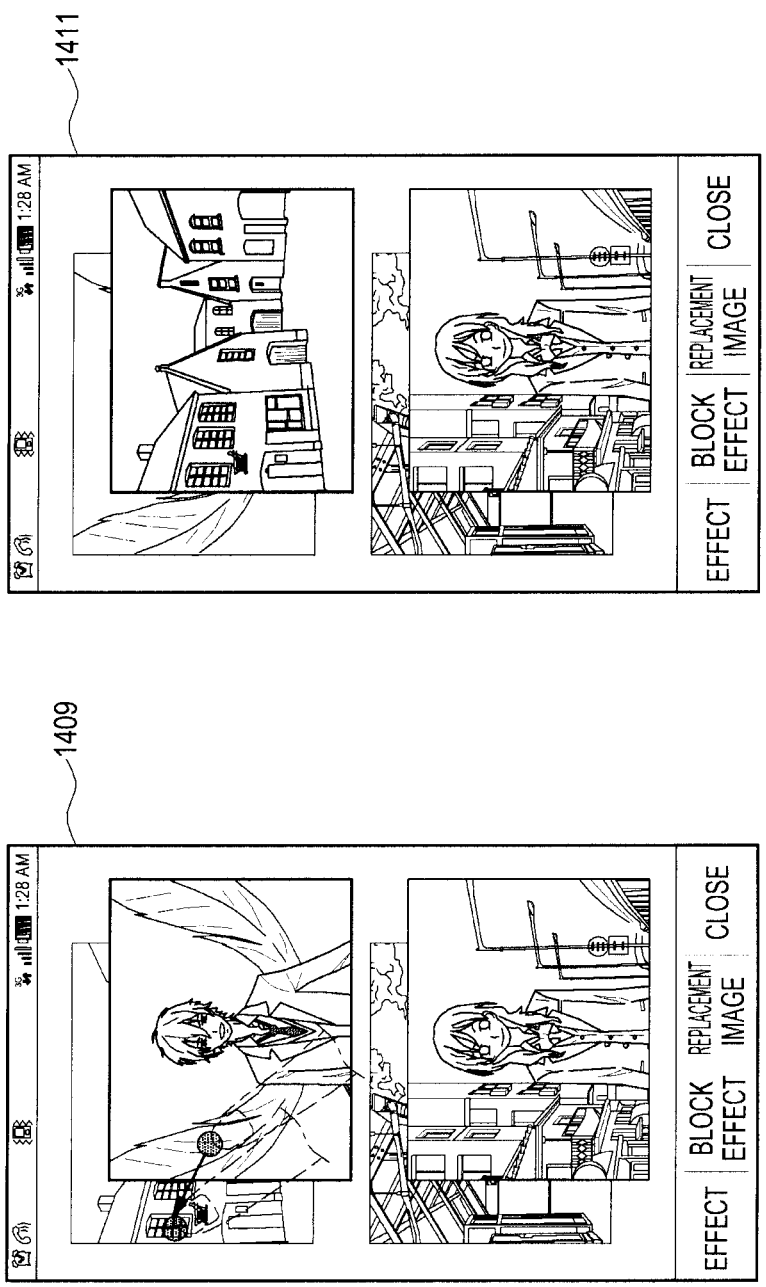

FIGS. 14A, 14B, and 14C illustrate screens to change the other party's image data, according to one embodiment of the invention. The other party's image data refers to combined data which is transmitted from the other party.

Referring to FIGS. 14A, 14B, and 14C, when the user inputs a first expansion gesture, as shown in a screen 1401, the first portable terminal 101 displays image data selected by the first expansion gesture among the plurality of image data included in the fourth combined data in maximum size of the selected image data, as shown in a screen 1403. The first expansion gesture refers to a gesture to use two fingers to pinch out on the screen. Such a gesture can result in the size of the image expanding and/or zooming in of the image.

When the user inputs a first reduction gesture, as shown in a screen 1405, the first portable terminal 101 displays the plurality of image data included in the fourth combined data in layers, as shown in a screen 1407. The first reduction gesture refers to a gesture to use two fingers to pinch in on the screen.

Figure 15A:
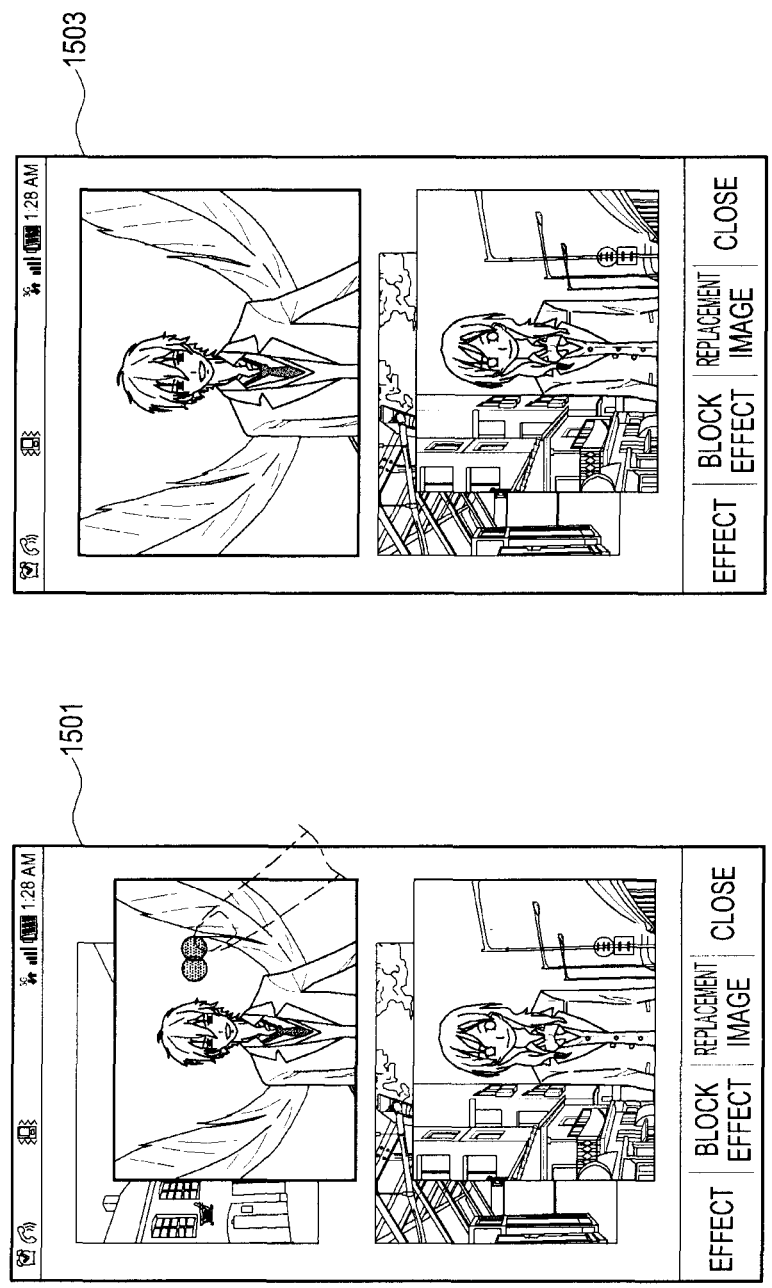
FIG. 15A and FIG. 15B illustrate screens to change the other party's image data, according to another embodiment of the invention.
Figure 15B:
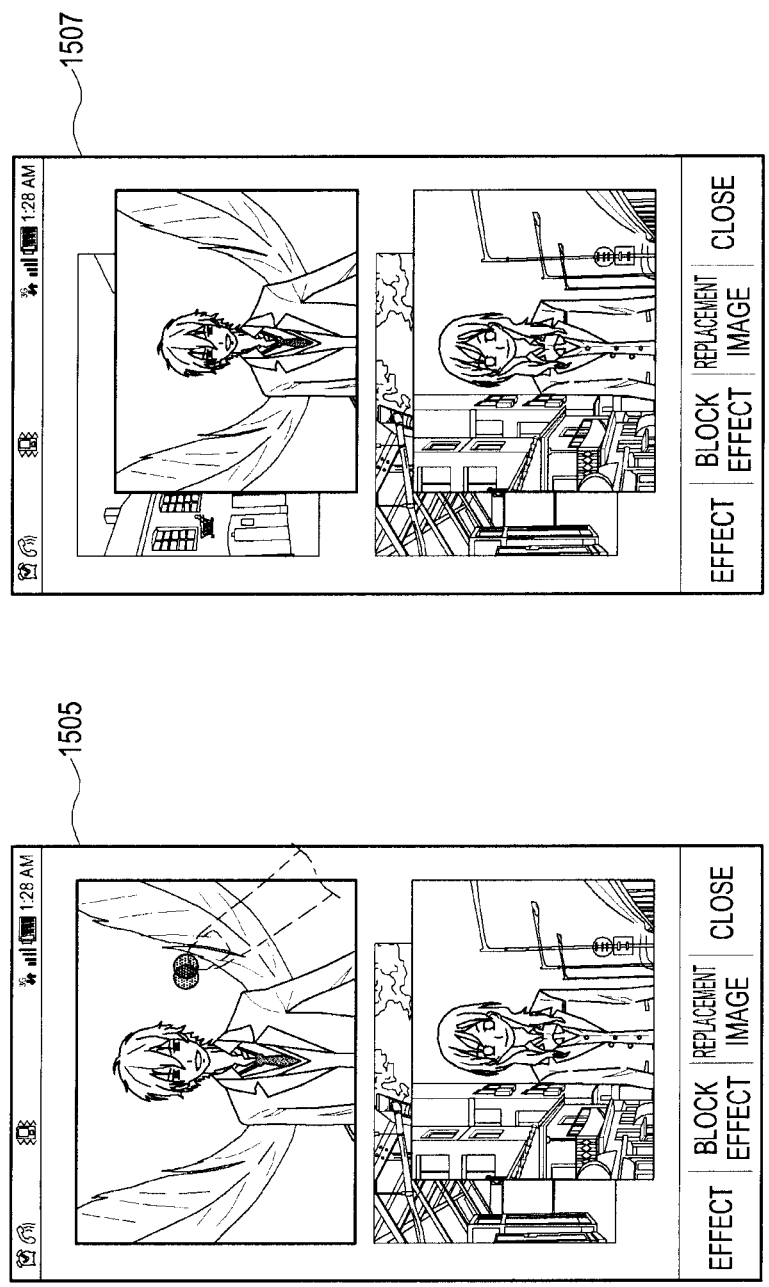

When the user inputs a changing gesture, as shown in a screen 1409, the first portable terminal 101 changes positions among the plurality of image data included in the fourth combined data and displays the result, as shown in screen 1411. The changing gesture refers to a gesture to touch and drag one of the plurality of image data. FIGS. 15A and 15B illustrate screens to change the other party's image data, according to another embodiment of the invention.

Referring to FIGS. 15A and 15B, when the user inputs a second expansion gesture, as shown in a screen 1501, the first portable terminal 101 displays image data selected by the second expansion gesture among the plurality of image data included in the fourth combined data in maximum size of the selected image data, as shown in a screen 1503. The second expansion gesture refers to a gesture to double click (sometime referred to as a double tap) on one of the plurality of image data included in the second combined data.

When the user inputs a second reduction gesture, as shown in a screen 1505, the first portable terminal 101 displays the plurality of image data included in the fourth combined data in layers, as shown in a screen 1507. The second reduction gesture refers to a gesture to double click on expanded image data.

Figure 16A:
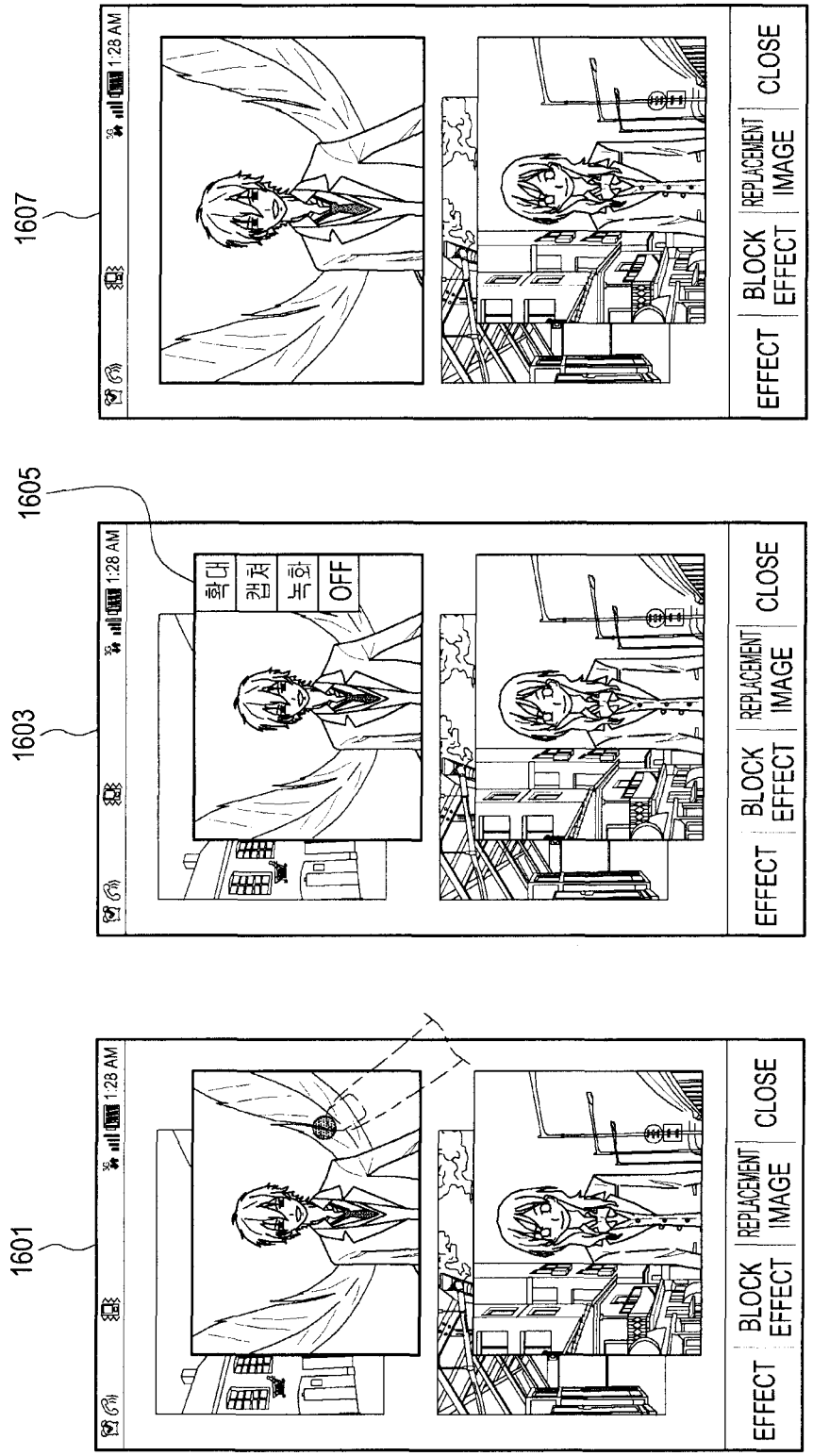
FIG. 16A and FIG. 16B illustrate screens to change the other party's image data, according to another embodiment of the invention.
Figure 16B:
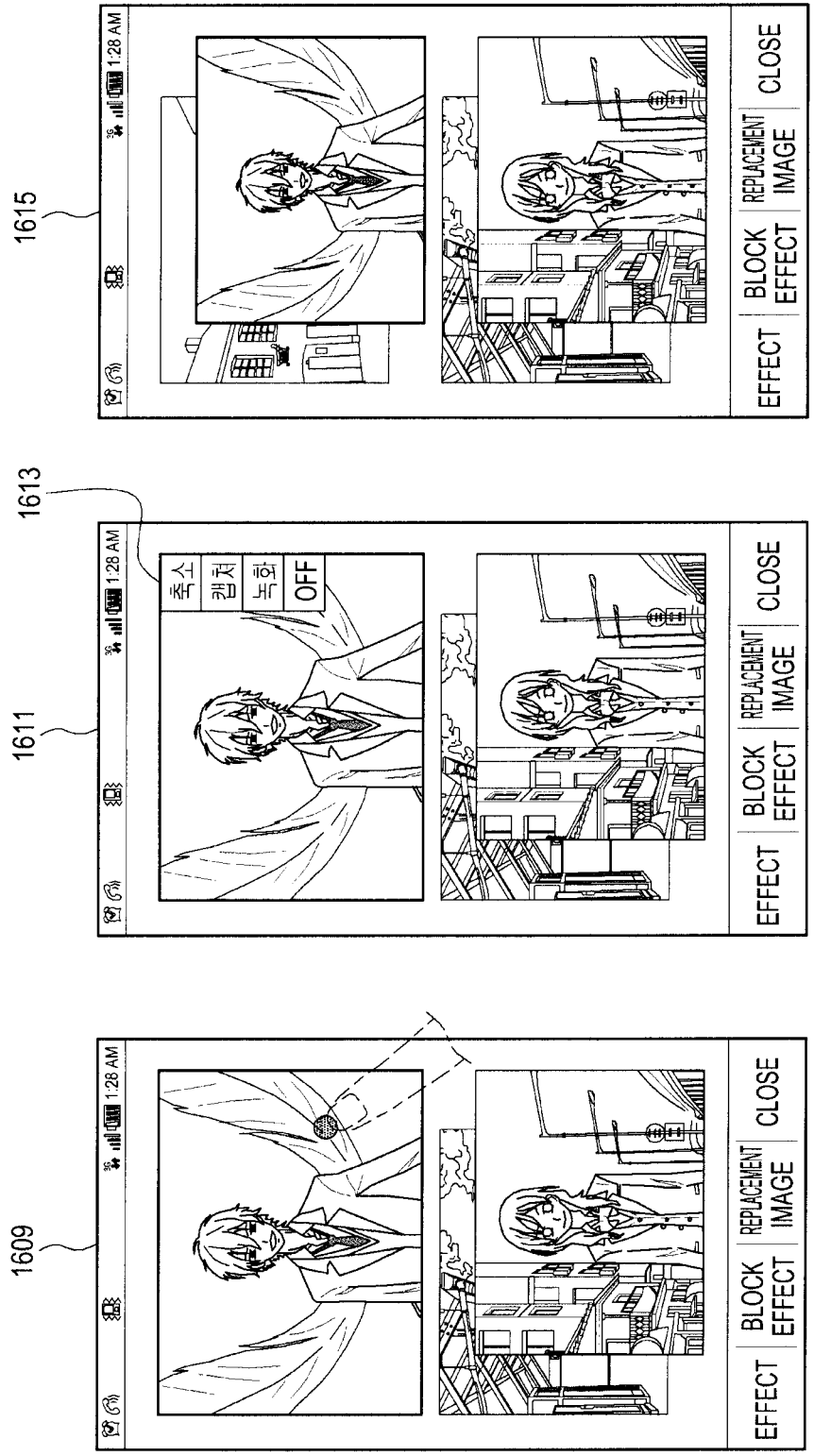

FIGS. 16A and 16B illustrate screens to change the other party's image data, according to another embodiment of the invention.

Referring to FIGS. 16A and 16B, when the user selects, for example by clicking or tapping on the fourth combined data, as shown in a screen 1601, the first portable terminal 101 displays a first menu bar, as shown in a screen 1603. The first menu bar includes an expansion menu, a capture menu, a recording menu, and an off menu to close the first menu bar. If the user selects the expansion menu 1605 in the first menu bar, the first portable terminal 101 displays one of the plurality of image data included in the fourth combined data in maximum size, as shown in a screen 1607.

When the user selects expanded image data, as shown in a screen 1609, the first portable terminal 101 displays a second menu bar, as shown in a screen 1611. The second menu bar includes a reduction menu, a capture menu, a recording menu, and an off menu to close the second menu bar. If the user selects the reduction menu 1613 in the second menu bar, the first portable terminal 101 displays the plurality of image data included in the fourth combined data in layers, as shown in a screen 1615.

In FIGS. 14A through 16C, it is described that the first portable terminal 101 expands or reduces any of the plurality of image data included in the fourth combined data, or changes positions among the plurality of image data, but it will be appreciated that the second portable terminal 105 may also expand or reduce any of the plurality of image data included in the second combined data, or changes positions among the plurality of image data, in the same way as used by the first portable terminal 101.

Figure 17A:
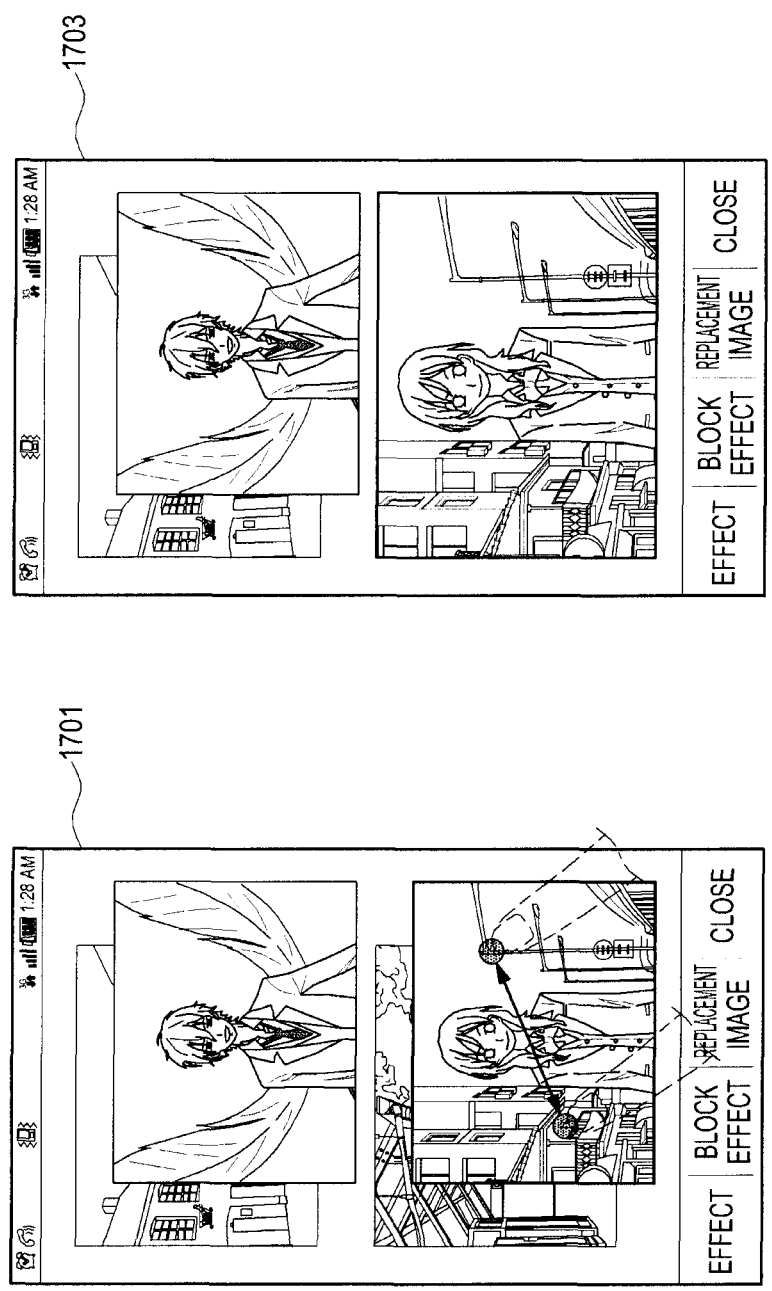
FIG. 17A, FIG. 17B and FIG. 17C illustrate screens to change its own image data, according to an embodiment of the invention.
Figure 17B:
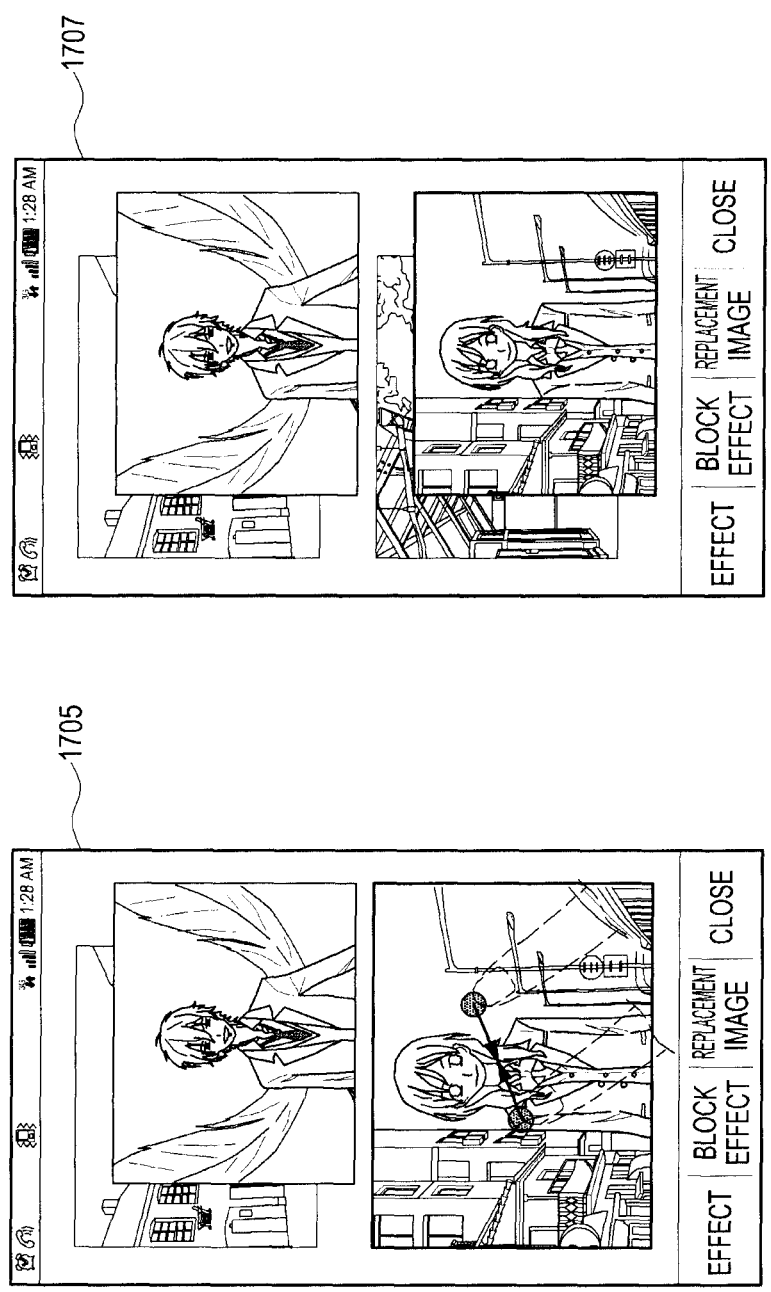
Figure 17C:
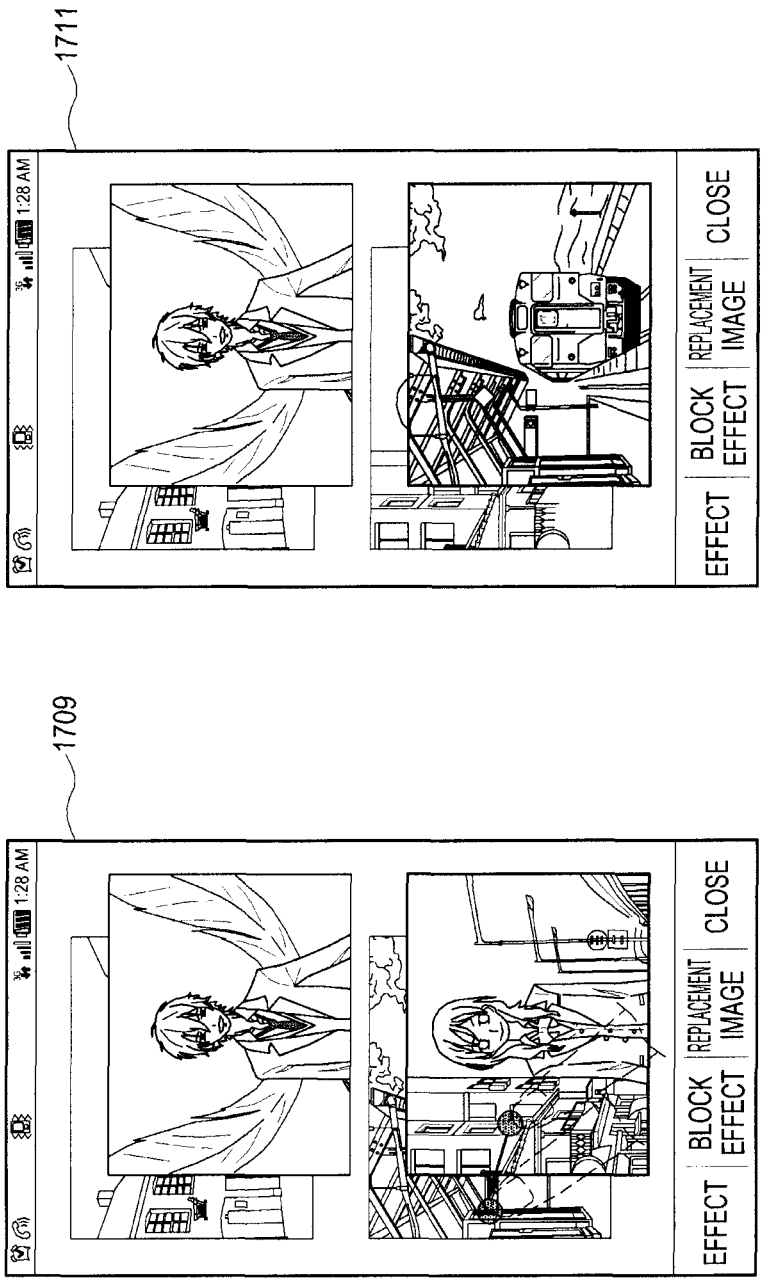

FIGS. 17A, 17B, and 17C illustrate screens to change its own image data, according to one embodiment of the invention. Its own image data means combined data generated and displayed by a corresponding portable terminal rather than combined data transmitted from the other party's portable terminal.

Referring to FIGS. 17A, 17B, and 17C, when the user inputs a third expansion gesture, as shown in a screen 1701, the first portable terminal 101 displays image data selected by the third expansion gesture among a plurality of image data included in the first combined data in maximum size of the selected image data, as shown in a screen 1703. The third expansion gesture refers to a gesture to use two fingers to pinch out on the screen.

The user inputs a third reduction gesture, as shown in a screen 1705, the first portable terminal 101 displays the plurality of image data included in the first combined data in layers, as shown in a screen 1707. The third reduction gesture refers to a gesture to use two fingers to pinch in on the screen.

When the user inputs a changing gesture, as shown in screen 1709, the first portable terminal 101 changes positions among the plurality of image data included in the first combined data and displays the result, as shown in a screen 1711. The changing gesture refers to a gesture to touch and drag one of the plurality of image data.

Figure 18A:
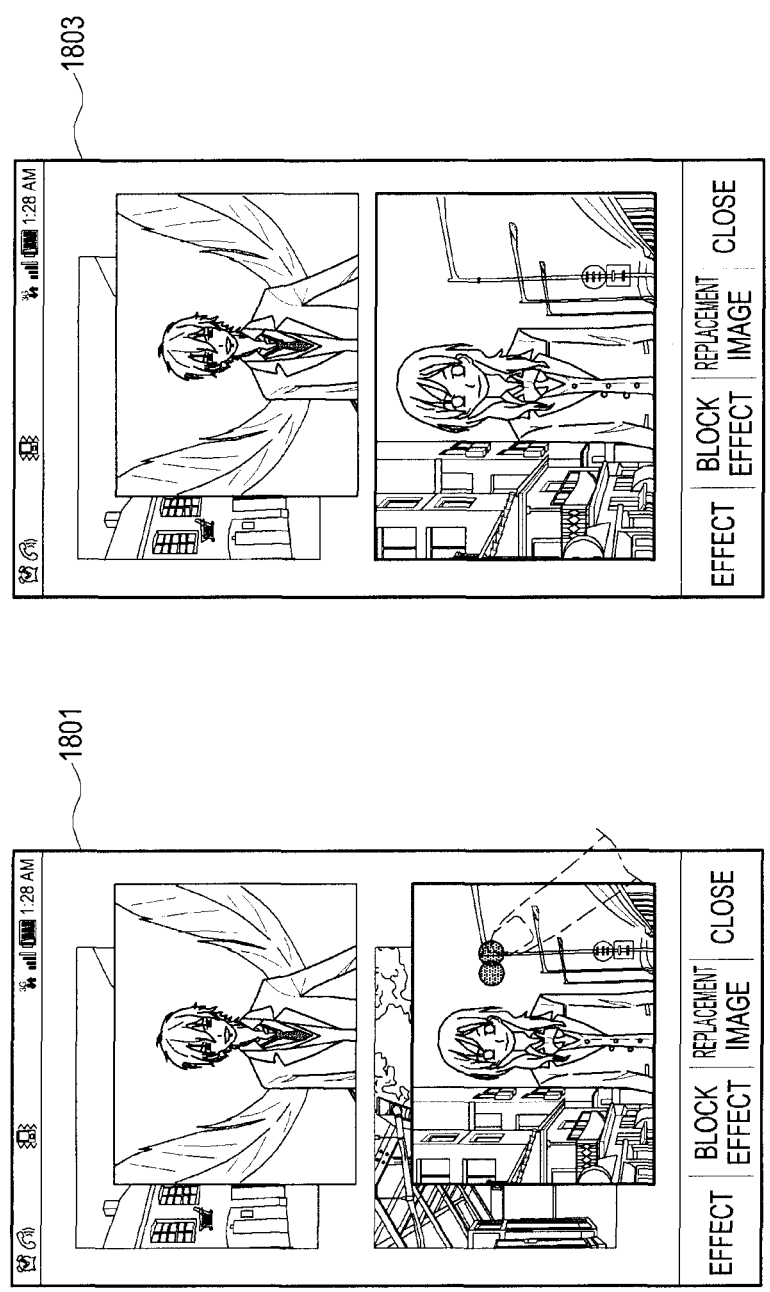
FIG. 18A and FIG. 18B illustrate screens to change its own image data, according to another embodiment of the invention.
Figure 18B:
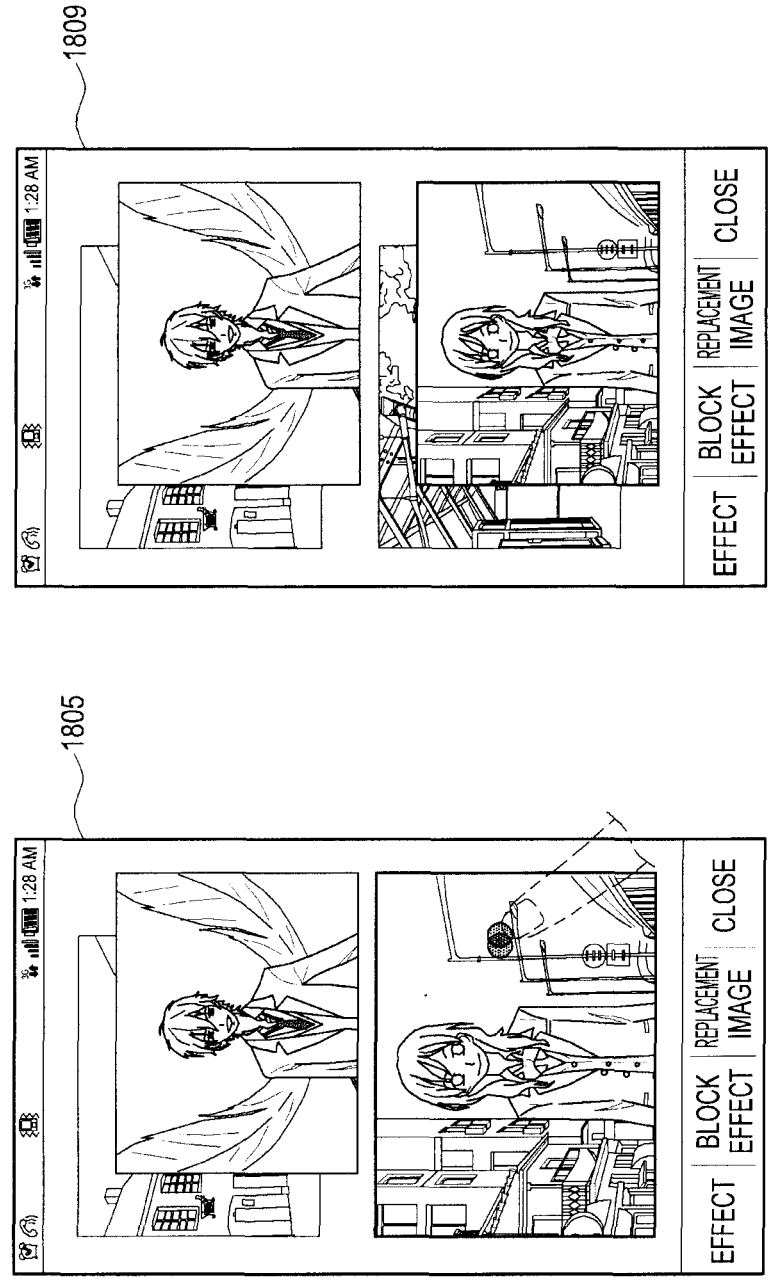

FIGS. 18A and 18B illustrate screens to change its own image data, according to another embodiment of the invention.

Referring to FIGS. 18A and 18B, when the user inputs a fourth expansion gesture, as shown in a screen 1801, the first portable terminal 101 displays image data selected by the fourth expansion gesture among a plurality of image data included in the first combined data in maximum size of the selected image data, as shown in a screen 1803. The fourth expansion gesture refers to a gesture to double click on one of the plurality of image data included in the second combined data.

When the user inputs a fourth reduction gesture, as shown in a screen 1805, the first portable terminal 101 displays the plurality of image data included in the first combined data in layers, as shown in a screen 1809. The fourth reduction gesture refers to a gesture to double click on expanded image data.

In FIGS. 17A through 18B, it is described that the first portable terminal 101 expands or reduces any of the plurality of image data included in the first combined data, or changes positions among the plurality of image data, but it will be appreciated that the second portable terminal 105 may also expand or reduce any of the plurality of image data included in the third combined data, or changes positions among the plurality of image data, in the same way as used by the first portable terminal 101. It is also considered within the scope of the invention to swap or change completely the gesture used to expand or reduce the plurality of image data or change positions.

In another embodiment of the present disclosure, if any of a plurality of image data is displayed to the fullest size while the plurality of image data is displayed in a layered form, other cameras than a camera that captures the image data displayed to the fullest size may be configured to be turned off. Afterwards, if a gesture to decrease the image data being displayed to the fullest size is made, the cameras, which have been turned off, may be turned on and the plurality of images are displayed again in the layered form.

Figure 19:
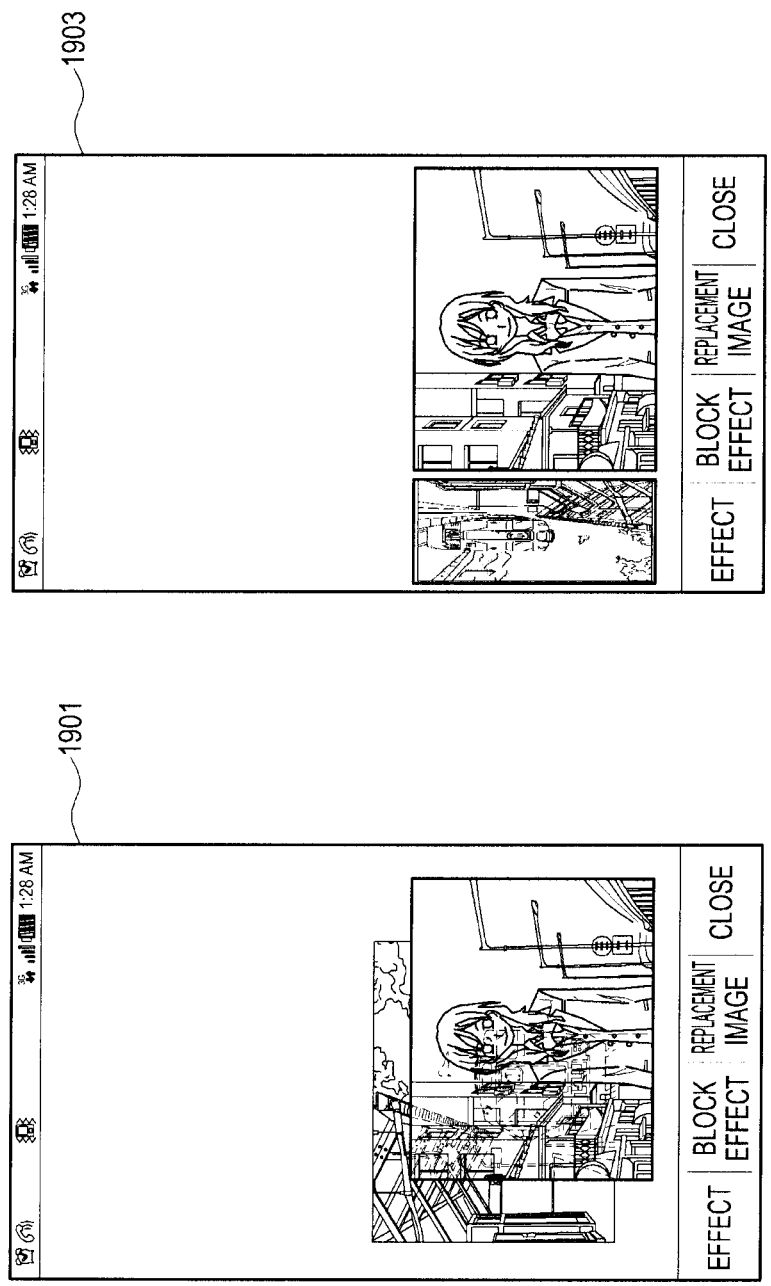
FIG. 19 illustrates screens to display image data, according to an embodiment of the invention.

FIG. 19 illustrates screens to display image data, according to an embodiment of the invention.

Referring to FIG. 19, the first portable terminal 101 displays a plurality of image data included in the first combined data in layers, as shown in a screen 1901 with the overlapping part among the plurality of image data being displayed to be translucent.

Alternatively, the first portable terminal 101 may display the plurality of image data included in the first combined data not to overlap one another, as shown in a screen 1903. At this time, the first portable terminal 101 may display the plurality of image data to be different in width.

In FIG. 19, the first combined data is described as an example, but it will be appreciated that the fourth combined data transmitted from the second portable terminal 105 may also be displayed in the same way.

Figure 20:
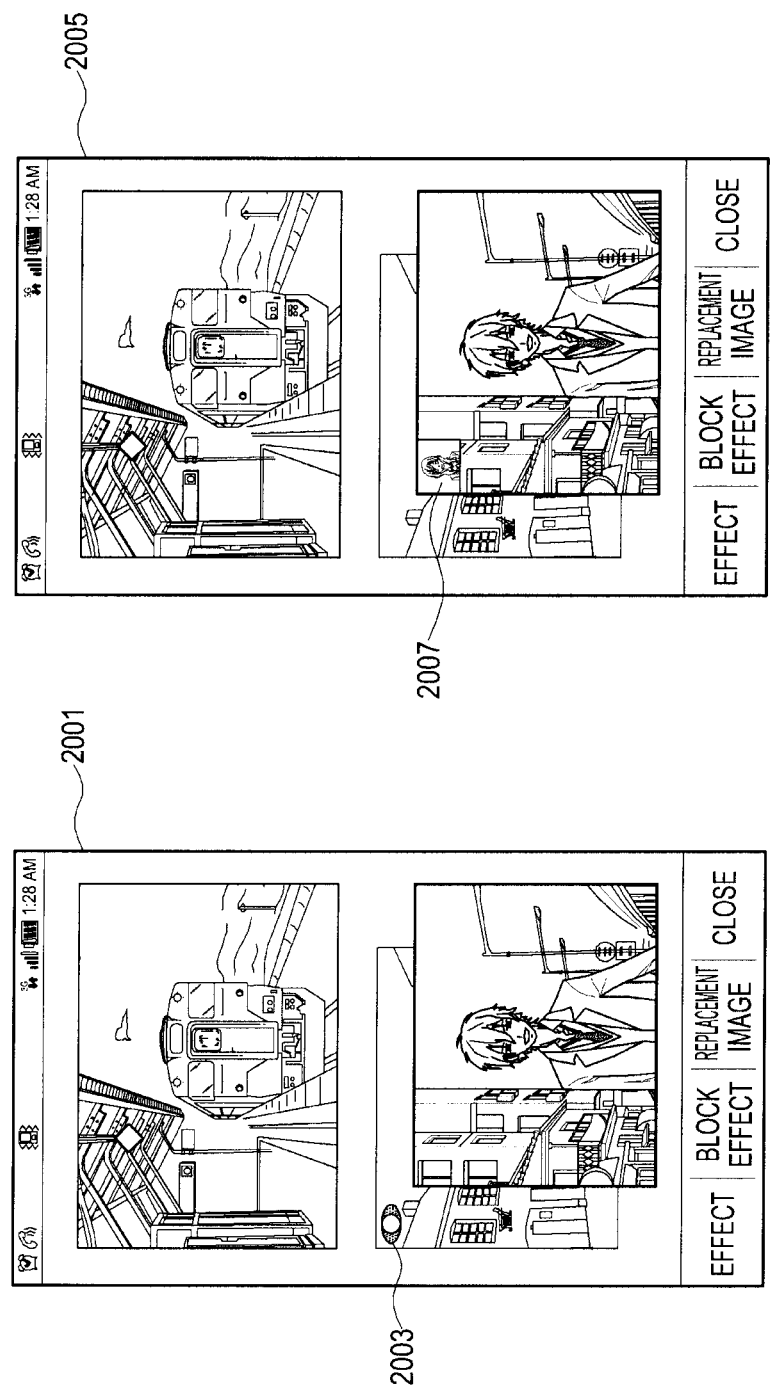
FIG. 20 illustrates screens to display icons for identifying image data displayed in the other party's portable terminal from among a plurality of image data, according to an embodiment of the invention.

FIG. 20 illustrates screens to display icons for identifying image data displayed in the other party's portable terminal from among a plurality of image data, according to an embodiment of the invention.

Referring to FIG. 20, if the second portable terminal 105 displays a second image data among a plurality of image data included in the second combined data in maximum size or displays the second the image data ahead of a first image data while displaying the plurality of image data in layers, the first portable terminal 101 generates, e.g., a first icon 2003 that represents that the second the image data is mainly displayed in the second portable terminal 105. And the first portable terminal 101 displays the first icon 2003 within image corresponding to the second image data, among a plurality of image data displayed in the first portable terminal 101, as shown in a screen 2001. The first icon may be featured as an eye, but can be substituted with any graphical icon or image.

If the second portable terminal 105 displays the first image date among the plurality of image data included in the second combined data in maximum size or displays the first image data ahead of the second image data while displaying the plurality of image data in layers, the first portable terminal 101 generates a second icon 2007 that represents that the first image data is mainly displayed in the second portable terminal 105. And the first portable terminal 101 displays the second icon 2007 within image corresponding to the first image data, among a plurality of image data displayed in the first portable terminal 101, as shown in a screen 2005. The second icon may be featured as the user of the second portable terminal 105.

In FIG. 20, it is described that the first portable terminal 101 displays an icon to identify image data mainly displayed in the second portable terminal 105 from among a plurality of image data, but it will be appreciated that the second portable terminal 105 may also display an icon to identify image data mainly displayed in the first portable terminal 101 from among a plurality of image data in the same way.

In the embodiments of the invention, a plurality of image data may be provided to the other party's portable terminal by transmitting or receiving a plurality of image data. In the embodiments of the invention, a plurality of image data may be provided to the other party's portable terminal by transmitting or receiving combined data by combining a plurality of image data.

The method for providing video calls in a portable terminal according to the embodiments of the invention may be embodied as computer-readable codes on a computer-readable recording medium. The computer-readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

Several embodiments have been described in connection with, e.g., mobile communication terminals, but it will be understood that various modifications can be made without departing the scope of the present invention. Thus, it will be apparent to those ordinary skilled in the art that the invention is not limited to the embodiments described, but can encompass not only the appended claims but the equivalents.

In connection with some of the embodiments described herein, a plurality of image data are combined for transmission, but in other embodiments, a plurality of image data may be transmitted on different channels without being combined. In the embodiment, it was described that a plurality of image data are combined for display, but in other embodiments, a plurality of image data may be respectively displayed without being combined.

While the embodiments described herein have been particularly shown and described with reference to embodiments thereof, it will be understood by those of ordinary skill in the art that various changes in form and details may be made therein without departing from the spirit and scope of the invention as defined by the following claims and their equivalents.

What is claimed is:

1. An apparatus for providing a video call in a user terminal, comprising:
    a plurality of cameras;
    a wireless transceiver;
    a display unit; and
    a controller configured to connect a video call between the user terminal and other user terminal and send to the other user terminal a plurality of images related to the video call through the wireless transceiver,
    wherein each the plurality of images is captured by each of the plurality of cameras,
    wherein the controller is configured to receive a plurality of images from the other user terminal through the wireless transceiver, and to display the received plurality of images on the display unit, and to mutually change positions of each of the received plurality of images if a changing gesture is inputted.

2. The apparatus of claim 1, wherein the plurality of images comprises a plurality of parts that is configured such that a part of each of the plurality of images is displayed on one screen.

3. The apparatus of claim 2, wherein the controller is configured to receive the plurality of images configured to have parts of the plurality of images displayed on one screen from the other user terminal through the wireless transceiver, and to display the received plurality of images on the display unit.

4. The apparatus of claim 1, wherein the controller is configured to create a combined image including at least a part of each of the plurality of images and to send the combined image to the other user terminal through the wireless transceiver.

5. The apparatus of claim 4, wherein the combined image is created based on at least one of arrangement information of the plurality of images for at least a part of each of the plurality of images to be displayed on one screen, size information of the combined image, and size information and position information of each of the plurality of images.

6. The apparatus of claim 5, wherein combination setting information includes at least one of the arrangement information, the size information of the combined image, and the size information and position information of each of the plurality of images and the combination setting information is sent to the other user terminal through the wireless transceiver.

7. The apparatus of claim 4, wherein the controller is configured to send a message providing image control authority for the other user terminal to control display of the plurality of images.

8. The apparatus of claim 7, wherein the controller is configured to send a message to the other user terminal that requests withdrawal of the authority for the other user terminal to control display of the plurality of images.

9. The apparatus of claim 7, wherein the controller is configured to create combined image by changing a size and a position of at least one of the plurality of images when receiving from the other user terminal a message requesting a change of display of the plurality of images, and to send the combined image.

10. The apparatus of claim 1, wherein each of the plurality of images comprises at least one of an image captured in real time by the plurality of cameras and an image pre-stored in a memory.

11. A method for providing a video call in a user terminal, the method comprising:
    obtaining a plurality of images, wherein the each of the plurality of images corresponds to each of a plurality of cameras of the user terminals;
    connecting a video call between the user terminal and other user terminal;
    sending to the other user terminal the plurality of images related to the video call,
    receiving a plurality of images from the other user terminal through a wireless transceiver;
    displaying the received plurality of images on a display unit; and
    mutually changing positions of each of the received plurality of images if a changing gesture is inputted.

12. The method of claim 11, wherein the plurality of images is configured such that a part of each of the plurality of images is displayed on one screen.

13. The method of claim 12, further comprising:
    receiving from the other user terminal a plurality of images configured such that a part of each of the plurality of images is displayed on one screen; and
    displaying by the user terminal the received plurality of images.

14. The method of claim wherein sending a plurality of images related to the video call to the other user terminal comprises,
    creating by the user terminal a combined image including a east a part of each of the plurality of images; and
    sending the combined image to the other user terminal.

15. The method of claim 14, wherein the combined image is created based on at least one of arrangement information of the plurality of images for at least a part of each of the plurality of images to be displayed on one screen, size information of the combined image, and size information and position information of each of the plurality of the images.

16. The method of claim 15, wherein combination setting information includes at least one of the arrangement information, the size information of the combined image, and the size information and the position information of each of the plurality of images and the combination setting information is sent to the other user terminal through the wireless transceiver.

17. The method of claim 14, further comprising: sending a message to the other user terminal to give image control authority for controlling display of the plurality of images.

18. The method of claim 17, further comprising: sending a message to the other user terminal that requests withdrawal of the authority for the other user terminal to control display of the plurality of images.

19. Previously Presented) The method of claim 17, further comprising:
    receiving from the other user terminal a message to request changing a display of the plurality of images;
    creating a combined image by changing size and position of any of the plurality of images based on the message to request changing the display of the plurality of images; and
    sending the combined image.

20. The method of claim 11, wherein each of the plurality of images comprise at least one of an image captured in real time by the plurality of cameras Of and an image pre-stored in a memory.

21. A method comprising:
    establishing, by a first terminal, a video call with a second terminal;
    combining, by the first terminal, a first image data with a second image data to generate a first video stream, wherein the first image data and the second image data are arranged in the first video stream in accordance with a first arrangement;
    transmitting the first video stream from the first terminal to the second terminal;
    receiving from the second terminal a first instruction to re-arrange the first image data and the second image data in the first video stream; and
    in response to the first instruction, re-arranging the first image data and the second image data, in the first video stream, in accordance with a second arrangement.

22. The method of claim 21, wherein the first image data is captured by a first camera and the second image data is captured by a second camera.

23. The method of claim 21, wherein:
    when the first image data and the second image data are arranged in accordance with the first arrangement, the first image data partially conceals the second image data; and
    when the first image data and the second image data are arranged in accordance with the second arrangement, the second image data partially conceals the first image data.

24. The method of claim 21, wherein
    when the first image data and the second image data are arranged in accordance with the first arrangement, a first frame size of the first image data is larger than a second frame size of the second image data; and
    when the first image data and the second image data are arranged in accordance with the first arrangement, the second frame size of the second image data is larger than the first frame size of the first image data.

25. The method of claim 21, further comprising:
    receiving a second video stream from the second terminal, the second video stream including a third image data and a fourth image data, wherein the third image data and the fourth image data are arranged in the second video stream in accordance with a third arrangement in which the third image data partially conceals the fourth image data;
    displaying the second video stream on a display unit of the first terminal; and
    in response to an input, transmitting to the second terminal a second instruction to re-arrange the first image data and the second image data, in the second video stream, in accordance with a fourth arrangement in which the fourth image data partially conceals the third image data.

26. An electronic device comprising a controller configured to:
    establish a video call with a far-end device;
    combine a first image data with a second image data to generate a first video stream, wherein the first image data and the second image data are arranged in the first video stream in accordance with a first arrangement;
    receive from the far-end device a first instruction to re-configure the first video stream; and in response to the first instruction, re-configure the first video stream by re-arranging the first image data and the second image data in accordance with a second arrangement.

27. The electronic device of claim 26, further comprising a first camera and second camera, wherein the first image data is captured by the first camera and the second image data is captured by the second camera.

28. The electronic device of claim 26, wherein:
when the first image data and the second image data are arranged in accordance with the first arrangement, the first image data partially conceals the second image data; and
when the first image data and the second image data are arranged in accordance with the second arrangement, the second image data partially conceals the first image data.

29. The electronic device of claim 26, wherein:
when the first image data and the second image data are arranged in accordance with the first arrangement, a first frame size of the first image data is larger than a second frame size of the second image data; and
when the first image data and the second image data are arranged in accordance with the first arrangement, the second frame size of the second image data is larger than the first frame size of the first image data.

30. The electronic device of claim 26 further comprising a display unit, wherein the controller is further configured to:
receive a second video stream from the far-end device, the second video stream including a third image data and a fourth image data, wherein the third image data and the fourth image data are arranged in the second video stream in accordance with a third arrangement in which the third image data partially conceals the fourth image data;
display the second video stream on the display unit; and
in response to an input, transmit to the far-end device a second instruction to re-arrange the third image data and the fourth image data, in the second video stream, in accordance with a fourth arrangement in which the fourth image data partially conceals the third image data.

* * * * *

UNITED STATES PATENT AND TRADEMARK OFFICE
CERTIFICATE OF CORRECTION

Page 1 of 1

PATENT NO. : 9,137,487 B2
APPLICATION NO. : 14/107234
DATED : September 15, 2015
INVENTOR(S) : Jin-Hong Jeong It is certified that error appears in the above-identified patent and that said Letters Patent is hereby corrected as shown below:

In the claims

Column 22, Claim 1, Line 23 should read as follows:
--...wherein each of the...--

Column 23, Claim 14, Line 32 should read as follows:
--...claim 11, wherein sending...--

Column 23, Claim 14, Line 36 should read as follows:
--...at least a part...--

Column 23, Claim 19, Line 58 should read as follows:
--...The method of claim 17...--

Column 24, Claim 20, Line 2 should read as follows:
--...images comprises at least...--

Column 24, Claim 20, Line 3 should read as follows:
--...cameras and an image...--

Signed and Sealed this
Second Day of February, 2016

Michelle K. Lee
*Director of the United States Patent and Trademark Office*